United States Patent [19]
Suga et al.

[11] Patent Number: 5,832,143
[45] Date of Patent: Nov. 3, 1998

[54] IMAGE DATA INTERPOLATING APPARATUS

[75] Inventors: Kazuyuki Suga, Tokyo; Hiroshi Kusao, Chiba; Takashi Nishimura, Tenri; Noritoshi Kakoh, Nara, all of Japan

[73] Assignee: Sharp Kabushiki Kaisha, Osaka, Japan

[21] Appl. No.: 716,569

[22] Filed: Sep. 19, 1996

[30] Foreign Application Priority Data

Jan. 17, 1996 [JP] Japan ..................................... 8-005822
Apr. 8, 1996 [JP] Japan ..................................... 8-085567

[51] Int. Cl.⁶ .................................................. G06K 9/36
[52] U.S. Cl. .......................................... 382/300; 382/278
[58] Field of Search ..................................... 382/300, 299, 382/278; 348/262, 441, 392; 358/105, 136, 160, 140, 450

[56] References Cited

U.S. PATENT DOCUMENTS

| | | | |
|---|---|---|---|
| 5,243,422 | 9/1993 | Owashi et al. ............................ | 358/140 |
| 5,294,984 | 3/1994 | Mori et al. ............................... | 358/160 |
| 5,410,356 | 4/1995 | Kikuchi et al. .......................... | 348/452 |
| 5,513,281 | 4/1996 | Yamashita et al. ...................... | 382/278 |
| 5,528,274 | 6/1996 | Hyodo ...................................... | 347/172 |
| 5,561,532 | 10/1996 | Ohnishi et al. ............................ | 386/47 |
| 5,617,143 | 4/1997 | Shimokoriyama et al. ............. | 348/407 |
| 5,657,082 | 8/1997 | Harada et al. ............................ | 348/262 |

FOREIGN PATENT DOCUMENTS 5153562 6/1993 Japan .
6141283 5/1994 Japan .

*Primary Examiner*—Leo H. Boudreau
*Assistant Examiner*—Kanji Patel

[57] ABSTRACT

When a scan line is interpolated, pixels on scan lines above and below the scan line which are referenced is interpolated in the horizontal direction. These pixels on the upper and lower scan lines are divided into blocks. Correlations between the upper and lower blocks with respect to a target pixel to be interpolated are calculated. Based on an evaluating function which is formed based on the correlations but is corrected with reference to the distance (or the direction) from the target pixel to each of the blocks, an optimal interpolating direction is selected. In addition, the difference in the pixel data between the interpolated pixel and each of the pixels around the interpolated pixel is checked in order to find interpolation errors. When an interpolating pixel data is determined to be erroneous, the pixel is interpolated using the pixels of data above and below the pixel.

8 Claims, 18 Drawing Sheets

SCAN LINE 1
SCAN LINE 2
SCAN LINE 3
SCAN LINE 4
SCAN LINE 5

SCAN LINE 1 REFERENCE PIXEL        A(0) ○
SCAN LINE 2
SCAN LINE 3 PIXEL TO BE INTERPOLATED B(0) ○  B(0)=A(0)
SCAN LINE 4
SCAN LINE 5

FIG. 14

|       | i−1   | i     | i+1   |
| ----- | ----- | ----- | ----- |
| j+4   | A(4)  | B(4)  | C(4)  |
| j+3   | A(3)  | B(3)  | C(3)  |
| j+2   | A(2)  | B(2)  | C(2)  |
| j+1   | A(1)  | B(1)  | C(1)  |
| j     | A(0)  | B(0)  | C(0)  |
| j−1   | A(−1) | B(−1) | C(−1) |
| j−2   | A(−2) | B(−2) | C(−2) |
| j−3   | A(−3) | B(−3) | C(−3) |
| j−4   | A(−4) | B(−4) | C(−4) |

IMAGE DATA INTERPOLATING APPARATUS

BACKGROUND OF THE INVENTION

(1) Field of the Invention

The present invention relates to an image data interpolating apparatus for use in video tape-recorders for displaying a high-quality still image, in particular, relating to an image data interpolating apparatus which is used in a system of interlaced scanning to generate a frame of data for a still picture by interpolating a field of data.

The present invention further relates to an image data interpolating apparatus which produces a high-quality still image in a video tape-recorder by selecting stationary areas and performing intra-field interpolation only for such areas, and separates stationary areas from moving areas in the frame data of interlaced scanning, in a high-quality television system or the like which can perform non-interlaced display free from flicker.

(2) Description of the Prior Art

Conventionally, when a still picture is produced in video tape-recorders, video printers, etc., which use a system of interlaced scanning, the first field of data is made to undergo an interpolating process to create a frame of data to eliminate the time lag between the video images of the first and second fields, thus producing a high-quality still image.

Referring to FIGS. 1 through FIGS. 9, description will be made of conventional technologies for image data interpolation which produces a frame of data by interpolating the first field data.

Here, FIG. 1 is a reference illustration showing an example of an original field of data in order to explain conventional techniques of image data interpolation. FIG. 2 is an enlarged diagram for explaining in detail the original field of data encircled in FIG. 1. FIG. 3 is a diagram explaining a method of interpolation for field data in which pixels to be interpolated are produced by using either of the upper or lower adjacent pixels. FIG. 4 is a diagram explaining a method of interpolation in which pixels to be interpolated are created by calculating the mean value of the upper and lower adjacent pixels. FIG. 5 is a diagram explaining a method of interpolation in which the correlation between pixels which are laid in oblique directions from the pixel to be interpolated are evaluated. FIG. 6 is an illustration for explaining an interpolating method which evaluates the correlation of pixels laid in five directions. FIG. 7 is an illustration for explaining an interpolating method which evaluates the correlation of pixels laid in seven directions. FIGS. 8 and 9 are reference diagrams relating to the judgment for selecting the direction for interpolation based on respective correlations.

Interlaced scanning is a method of scanning in which each frame of data is divided into two fields of data, which are activated at different times, and in order to produce a video image, each frame is scanned twice, which is referred to as the first and second scans, so that the gaps between the first scan traces will be filled up with the second scanning lines.

The two images which are individually and sequentially projected, will be recognized as one image by the effect of visual afterimage in human's eyes. However, when the two fields of data, which are thus sent separately with a time lag, are converted into the frame data to produce a still image, the following problem occurs:—namely, although no problem will occur if both the camera and subject stand absolutely still, if either or both are moving, the continuity between odd-numbered scan lines and even-numbered scan lines in the resulting image will become degraded due to the time lag between the two fields of data. That is, there will arise discrepancy between the first and second fields of data. As a result, the quality of the display image will be degraded.

To deal with this, the idea has been introduced that one frame of data can be made using just the data of either the first or second field. In this case, however, it is necessary to interpolate the image data since the field data to be used as a basis has data lines and empty lines alternately arranged as shown in FIG. 2. Various other methods have been proposed conventionally to perform interpolation of the image data. Some of these will be explained below.

In the description hereinbelow, $B(0)$ represents the pixel data to be interpolated, $A(n)$ and $C(n)$ represent the reference data of pixels, which are evaluated to at interpolation, on upper and lower horizontal scan lines, respectively. Here, 'n' indicates the number allocated for each pixel on the horizontal line based on pixel data $B(0)$.

The first method is to simply repeat the adjacent pixel data. That is, as shown in FIG. 3, the interpolation of the field data is performed by using the data of each pixel on odd-numbered lines of the field image, e.g., scan line 1, scan line 3, ... as they are so as to produce the pixel data of scan line 2, scan line 4, ...

Specifically, in this method, the interpolation will be performed with $B(0)=A(0)$. Needless to say, the odd-numbered lines may be interpolated by using the data of even-numbered lines. In accordance with this method, the resolution in the vertical direction will be reduced to its half and therefore jaggedness will become markedly conspicuous along sloping lines.

Next, as shown in FIG. 4, follows a method in which interpolation is performed by evaluating the mean value of the two pieces of data of the reference pixels located above and below the pixel to be interpolated.

Specifically, in this method, the interpolation will be performed with $B(0)=\{A(0)+C(0)\}/2$. In accordance with this method, jaggedness will be alleviated to some degree, but the edge will be degraded so that the resulting image will give the impression of being blurred.

Another known method is one in which the gradient of the edge is considered as shown in FIG. 5, by calculating the difference in the data of each pair of reference pixels which are located opposite each other with the pixel to be interpolated in the center. This calculation is performed for, as a whole, three directions, that is, not only for the pixels above and below the interpolation target pixel, but also the pixels in the oblique direction from the upper right to the lower left, as well as those in the oblique direction from upper left to the lower right. Of these pairs of pixels, the one which produces the minimum difference is picked up and its mean value of the pixel data is taken in order to interpolate the target pixel.

More specifically, in accordance with this method, the minimum value of $|A(-1)-C(1)|$, $|A(0)-C(0)|$ and $|A(1)-C(-1)|$ is selected and based on this selection, one of the mean values are selected from $$B(0)=\{A(-1)+C(1)\}/2$$

$$B(0)=\{A(0)+C(0)\}/2$$

$$B(0)=\{A(1)+C(-1)\}/2,$$

so that the selected mean value is used as the interpolating image data for the interpolation target pixel.

However, some images may have edges with rather gentle gradients, which lies closer to the horizontal line. Consequently, it becomes difficult for the above three-directional interpolation to deal with all the cases. In order to further improve the interpolation, it is necessary to evaluate the pixels around the target pixels in more directions, for example, five or seven directions, as shown in FIGS. 6 and 7. In this case, however, as the reference pixels become farther from the pixel B(0) to be interpolated like A(−3) and C(3), or A(3) and C(−3) in FIG. 7, the pixels become less related to the interpolation target pixel, however the possibility becomes higher that those pixels may have luminance very similar to each other. When this case occurs, the interpolation target pixel B(0) might be represented by data which has no connection with the data of the neighboring pixels, thus the interpolated pixel might strikingly stand out as irregularity on the image.

Japanese Patent Application Laid-Open Hei 5 No. 153,562 discloses improvements for the conventional image data interpolating technology. In this image data interpolating technique, seven directions as shown in FIG. 7 are assumed for the interpolation. In the seven directions, the central three pairs of pixels, i.e., A(−1) and C(1), A(0) and C(0), and A(1) and C(−1) in FIG. 7 are defined as the first region. First, the directional correlation is checked for each of the three directions in the first region. Then, if there is a correlation in any of the oblique directions, specifically, A(−1) and C(1) or A(1) and C(−1), the correlation in other more gentle sloping directions is checked. That is, if, in the initial stage of the judgment, it is determined that there is a correlation between A(1) and C(−1), then the correlations between A(1) and C(−1), A(2) and C(−2), and A(3) and C(−3) which are defined as the second region, are checked. When it was determined that there was a correlation between A(−1) and C(1), then the correlations between A(−1) and C(1), A(−2) and C(2), and A(−3) and C(3) which are defined as the third region, are checked. In this way, the pair which presents the greatest correlation will be determined and the interpolating pixel data will be decided based on this determination.

However, in accordance with these conventional technologies for image data interpolation, some cases still may occur where interpolation can not be performed appropriately. Consequently, jaggedness arises along counters in the resultant interpolated image which should originally be smooth, and there are quite a few cases where irregularities due to erroneous interpolation (the fact of being interpolated inappropriately, or the pixel interpolated inappropriately will be referred to as 'erroneous interpolation' hereinbelow) stand out.

The first reason why erroneous interpolation occurs is that an edge in the image does not always lie along the actual pixels. For example, consider a case where B(0) should be interpolated in the image shown in FIG. 8. In this case, it is assumed that a line L extends intersecting the boundary portion between A(0) and A(1) and the boundary portion between C(−1) and C(0) while pixels A(3) and C(−3) has the same image data. Images from this condition may occur when digitized video images of the NTSC system or the like which are not so high in resolution as printed materials etc. are handled.

Here, suppose that pixel data values for A(0), A(−1), C(−1) and C(0) are 5, 5, 6 and 3, respectively while pixels A(3) and C(−3) have the same image data 'x'. Further, it is also assumed that the other reference pixels have a weak correlation. In this case, the difference between A(0) and C(0) is 2 while the difference between A(1) and C(−1) is 1. Therefore, these difference values are estimated grater than that between A(3) and C(−3). More explicitly, in this case, it is determined that the correlation between A(0) and C(0) and the correlation between A(1) and C(−1) are smaller than the correlation between A(3) and C(−3). Consequently, B(0) is interpolated by the mean value of image data A(3) and C(−3). This situation would also occur in the aforementioned method proposed by Japanese Patent Application Laid-Open Hei 5 No. 153,562 because the above arrangement would be determined as an oblique line in the first stage of the judgment.

Secondarily, in accordance with the method disclosed in Japanese Patent Application Laid-Open Hei 5 No. 153,562, if, in contrast to the first example, the target pixel should be interpolated by A(3) and C(−3), it is likely to occur that the target pixel is erroneously interpolated by A(0) and C(0). That is, in this method, if no correlation is detected in the oblique directions when the correlations in the three directions in the first region, between A(0) and C(0), A(−1) and C(1), and A(1) and C(−1) shown in FIG. 9 are checked, no further check of the correlation for the second and third regions will be performed.

For the above reason, in the case where an edge has a gentle gradient, even if the correlation between A(−3) and C(3) is the strongest, there is a possibility that these reference pixels will not be used to produce the interpolation pixel data.

Meanwhile, when a still image is displayed with a typical video tape-recorder or video printer, etc., the data of one field alone is made to undergo an interpolating process to produce its frame data. In this case, however, since the amount of information is reduced to half its original amount, the quality of the image must become inferior to that of the image which is produced by the frame data consisting of two fields of data which was taken when the camera and subject completely stood still. To avoid this degradation, a method has been introduced in which the frame data is prepared in such a way that stationary portions in the image are picked up as they are, whilst the moving parts are produced based on either the first or second field. In this method, it becomes necessary to separate moving portions from stationary portion in the image.

Various methods have previously been proposed to detect moving portions. Some of them will be described. The first method uses two frames of data. That is, as shown in FIG. 10, the difference between the two 'first fields of data' and the difference between the two 'second fields of data' are produced to detect moving points in each field and thereafter the logical sum between the two is executed. This method is quite reasonable since there is a positional shift in the vertical direction between the first and second fields due to interlaced scanning, it is not appropriate to simply difference the first and second field data. However, the use of two frames of data increases the cost for the hardware of the apparatus. Further, the stationary portions are prepared by detecting the image which is made up of two consecutive fields of data, from the four consecutive fields of data, whilst the moving portions are detected based on two fields of data with the in-between field skipped. Therefore, there might occur detecting errors in some cases depending upon the movement of the picture.

The second method uses only one set of frame data. In this case, as shown in FIG. 11 the positional adjustment of the first field to the second field in the vertical direction is first performed before taking the difference. Specifically, as shown in FIG. 12, in order to determine the movement of a pixel designated at row 'i' and column 'j' (to be abbreviated as pixel (i,j) for designating pixels), the data of pixel (i,j) is compared to the mean value of the data of pixel (i+1,j) and the data of pixel (i31 1,j), thus performing the judgment of movement. This method is disclosed in Japanese Patent application Laid-Open Hei 6 No. 141,283.

There is reference to a method in which the pixels in the field are partitioned into blocks each having a number of pixels proximal to each other, each difference in luminance level between corresponding pixels in different blocks is calculated and the sum of the absolute values of the differences is compared to a threshold, in order to alleviate the influence of noise.

In the aforementioned conventional technique using data for one frame, there are quite a few cases that exact detection on movement can not be performed. Now, suppose that based on the first field data, another 'second field data' for movement detection is newly produced by taking the mean value of the data of the upper and lower scan lines in the first field. The first field which is original has a sharp image, whereas the composed second field for movement detection generally is an unsharp image with horizontal and oblique edges blurred by the averaging treatment. In one word, the two image differ greatly from each other in their space frequency band ranges with respect to the vertical direction.

For the above reason, when the difference between the two images is taken, the difference between the pixel data of the first field and the pixel data of the second field for movement detection will not always become small, particularly in the areas of horizontal and oblique edges. Accordingly, when the resultant value is compared to a fixed threshold for movement detection in order to judge whether the area is moving, areas having a horizontal or oblique edge are likely to be erroneously recognized as moving points. Thus, despite that this movement detecting scheme is devised in order to enable the use of the frame data for the stationary portions, when the image undergoes a still image preparing treatment, only flat portions in the image can be represented with the frame data, while edge portions which are of greater importance as image elements tend to be erroneously detected and will be prepared by the intra-field interpolation. Therefore, the resulting image cannot make a great difference from that of the frame data which is merely composed only from the field data without performing the movement detection, and little improvement of the quality of image can be expected.

Further, when a number of pixels lying proximal to each other are made into blocks in order to perform detection of movement, there is a concern that quite a few of minute movements might be missed, though some measurement against noise can be taken.

SUMMARY OF THE INVENTION

The present invention has been devised under the consideration of the above problems and it is therefore an object of the present invention to provide an image data interpolating apparatus which is able to perform pertinent smooth interpolation even for edges having gentle gradients, and is able to compose a frame of image data with high quality from a single field of image by removing irregularities generated due to erroneous interpolation after the interpolating procedure so as to inhibit the occurrence of the interpolation errors.

It is another object of the invention to provide a data interpolating apparatus which is able to produce an exact movement detection per pixel for any types of frame data using a simple algorithm or a small-sized hardware.

In order to attain the above objects, the present invention has the following configurations:

In accordance with the first feature of the invention, an image data interpolating apparatus for producing one frame of data using one of two fields of data which respectively constitute pixel data on the odd-numbered scan lines and even-numbered scan lines of a frame data so that the pixel data on the even-numbered or odd-numbered scan lines of the other field will be interpolated, wherein one frame of data is yielded by interpolating one field of data by such steps comprising: determining an interpolating direction on the basis of a pixel to be interpolated; and producing interpolating pixel data corresponding to the pixel to be interpolated based on the pixel data of the pixels located in the interpolating direction, includes:

a reference pixel data generating means for generating a first row of reference pixel data corresponding to the scan line of pixels which belong to the one of the two fields and lie adjacent to and above the pixel to be interpolated and a second row of reference pixel data corresponding to the scan line of pixels which belong to the one of the two fields and lie adjacent to and below the pixel to be interpolated;

an interpolating direction determining means for determining an interpolating direction for the pixel to be interpolated based on the calculated result of the correlations between a first block of data which consists a group of pixel data of a predetermined number of consecutive reference pixels and belongs to the first row of reference pixel data and a second block of data which consists of a group of pixel data of the same number of consecutive reference pixels, belongs to the second row of reference pixel data and lies opposite the first block of data with the pixel data to be interpolated in between; and an interpolating pixel data producing means for producing data for the pixel to be interpolated based on the pixel data corresponding to the pixels which lie in the interpolating direction determined by the interpolating direction determining means and belong to the scan lines of the one of the two fields and are located adjacent to, and above and below the pixel to be interpolated.

Next, in accordance with the second aspect of the invention, an image data interpolating apparatus for producing one frame of data using one of two fields of data which respectively constitute pixel data on the odd-numbered scan lines and even-numbered scan lines of a frame data so that the pixel data on the even-numbered or odd-numbered scan lines of the other field will be interpolated, wherein one frame of data is yielded by interpolating one field of data by such steps comprising: determining an interpolating direction on the basis of a pixel to be interpolated; and producing interpolating pixel data corresponding to the pixel to be interpolated based on the pixel data of the pixels located in the interpolating direction, includes:

a judging means for judging whether interpolating data of the pixel to be interpolated is proper based on the comparison of the interpolating pixel data with the pixel data of the pixels neighboring or near the pixel to be interpolated; and an interpolating data correcting means for correcting the interpolating pixel data by replacing the interpolating pixel data with a piece of correcting data which is prepared from the pixel data of the pixels neighboring or near the pixel to be interpolated when the result of the judgment by the judging means indicates the necessity of correction.

The third aspect of the invention resides in the image data interpolating apparatus having the first feature above, wherein the interpolating direction determining means calculates the correlations by weighting in accordance with the interpolating direction.

The fourth aspect of the invention resides in the image data interpolating apparatus having the second feature above, wherein the judging means makes the comparison of the interpolating pixel data with the pixel data of the pixels neighboring or near the pixel to be interpolated, by evaluating the second-order derivatives or the eight-directional laplacian.

In accordance with the fifth aspect of the invention, an image data interpolating apparatus has a movement detecting means for detecting the movement in a frame of image which consists of two fields of image, namely odd and even fields in interlaced scanning, wherein the movement detecting means comprises: a data composing means for newly composing the first movement detecting field data in one of the two fields of data by performing pixel interpolation so that the distance between the scan lines in the vertical direction is divided in a ratio of a:1−a where 0<a<1 and a≠0.5 and newly composing the second movement detecting field data in the other field of data by performing pixel interpolation so that the distance between the scan lines in the vertical direction is divided in a ratio of 0.5+a:0.5−a; and a data difference detecting means for detecting the difference between the first movement detecting field data and the second movement detecting field data.

Further, the sixth aspect of the invention resides in the image data interpolating apparatus having the fifth feature above, wherein the data difference detecting means comprises: a calculating means for calculating the difference between the pixel data of the first movement detecting field data and that of the pixel data of the second movement detecting field data, both at the corresponding positions within each field; a movement judging threshold-outputting means; and a comparing means for comparing the output value from the calculating means with the movement judging threshold outputted from the movement judging threshold-outputting means, and the movement judging threshold-output means has a movement judging threshold-generating means which generates the movement judging threshold as a sum of a fixed component and a variable component controlled depending upon the characteristic of the image.

Moreover, the seventh aspect of the invention resides in the image data interpolating apparatus having the sixth feature above, wherein the variable component is determined by the steps of: selecting the minimum value as the first parameter from first and second absolute values which are calculated for a target pixel whose movement is detected and a couple of pixels located adjacent to, and above and below the target pixel, all residing within the same field, where the first absolute value is defined as the absolute value of the difference in the pixel data between the target pixel and the upper pixel and the second absolute value is defined as the absolute value of the difference in the pixel data between the target pixel and the lower pixel; calculating the second parameter which is the absolute value of the difference in the pixel data between the pixels adjacent to, and above and below the target pixel within the other field; and determining the variable component based on the maximum of the first and second parameters.

In accordance with the image data interpolating apparatus of the invention thus configured, the reference pixel data generating means generates the first row of reference pixel data by performing interpolation of the pixel data arranged on the scan line adjacent to and above a target pixel to be interpolated, by inserting mean values of two adjacent pixels in between. Similarly, the means generates the second row of reference pixel data by performing interpolation of the pixel data arranged on the scan line adjacent to and below the target pixel, by inserting mean values of two adjacent pixels in between. Thus, the number of the reference pixel data in the horizontal direction is increased. The interpolating direction determining means estimates the correlation for each direction, by calculating a correlational value between a first block of data on the upper scan line above the target pixel to be interpolated and a second block of data which lies on the lower scan line and at a symmetric position of the first block on the opposite side of the target pixel, and weights the calculated result of the correlational values in accordance with the direction for interpolation so as to determine the optimal direction for interpolation based on the calculated result. The interpolating pixel data producing means produces a piece of interpolating pixel data for the pixel to be interpolated using pixel data of the pixels located in the determined direction for interpolation. Further, in accordance with the interpolating apparatus of the invention, the judgment means judges whether interpolating data of the pixel to be interpolated is proper (or erroneous) based on the comparison of the interpolating pixel data with the pixel data of the pixels around (adjacent to or near) the pixel to be interpolated, by using the second-order derivatives or the eight-directional laplacian. As a result of this judgment, when the interpolating pixel data is not proper, the interpolating data correcting means produces correcting data from the pixel data of the pixels adjacent to or near the pixel to be interpolated and replaces the interpolating pixel data with this correcting data to achieve the proper interpolation.

Further, in accordance with the invention, since a couple of field data for movement detection whose phases and frequency ranges with respect to the vertical direction are close to one another, are composed from the two fields of data of interlaced scanning, namely, the odd-numbered line field and even-numbered line field and are compared to one another, it is possible to perform the movement detection with a very high precision. In the conventional method, only one of the two fields was used to perform interpolation and therefore the frequency ranges of the two fields were different from each other, thus causing erroneous detection. Therefore, the aforementioned feature is a remarkable advantage over the conventional method.

Moreover, since in stead of the two frame scheme in which movement detection is performed by differencing two fields of the same type as stated in the prior art, one frame scheme is used in this invention, it is possible to manage to perform the operation with one frame memory. Therefore, a reduction of the cost can be expected. In accordance with the invention, since the threshold for the judgment of movement is given in the form of a sum of a variable component and a fixed component which is preset as a limit below which the image data cannot be recognized as a visual moving point, the fixed value is made predominant for the detection of moving portions. Consequently, it is possible to attain effective movement detection free from errors of the movement detection due to minutely blurred portions.

Finally, since the threshold for the movement judgment will become large when pixels whose movements are detected lie in a horizontal edge of a stationary portion, erroneous judgment of the edge of the stationary portion as a movement portion can be prevented, thus making it possible to perform effective movement detection.

BRIEF DESCRIPTION OF THE DRAWINGS

FIG. 14 is an image data arrangement view showing the layout of data of pixels around a pixel to be interpolated by an image data interpolating apparatus in accordance with the embodiment of the invention;

DESCRIPTION OF THE PREFERRED EMBODIMENTS

Figure 1:
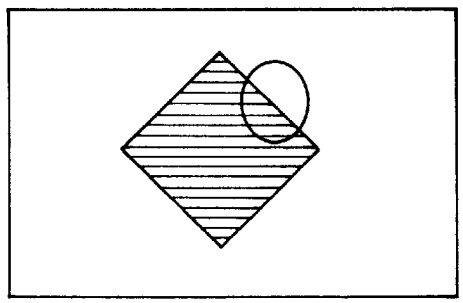
FIG. 1 is a reference illustration showing an example of an original field of data in order to explain conventional techniques.
Figure 2:
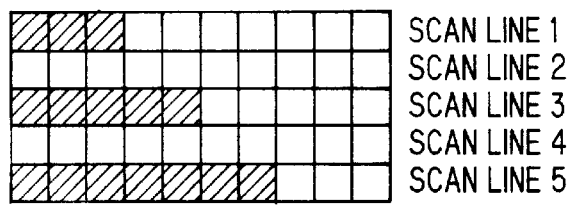
FIG. 2 is a diagram for explaining in detail the original field of image in order to explain conventional techniques.
Figure 3:
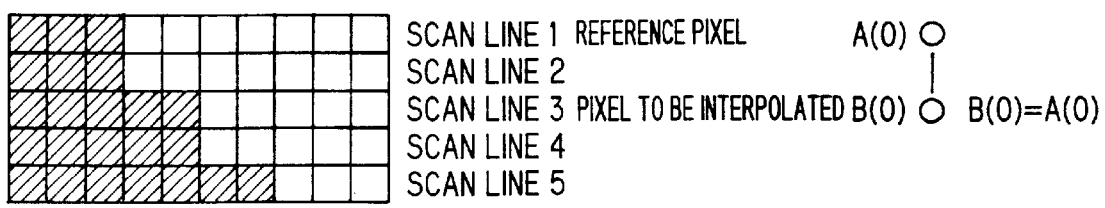
FIG. 3 is a diagram explaining a prior method of interpolation in which pixels to be interpolated are produced by using either of the upper or lower adjacent pixels in the vertical direction.
Figure 4:
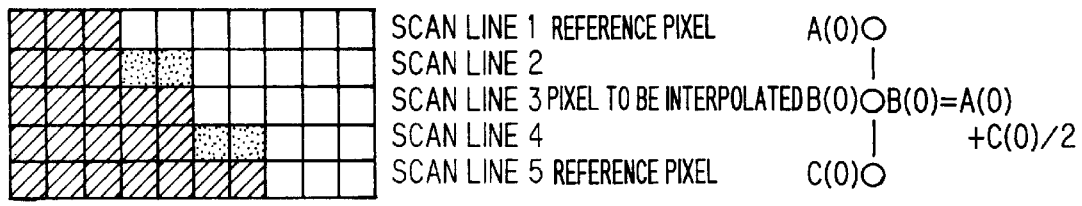
FIG. 4 is a diagram explaining a prior method of interpolation in which pixels to be interpolated are inserted with the mean value of the upper and lower adjacent pixels in the vertical direction.
Figure 5:
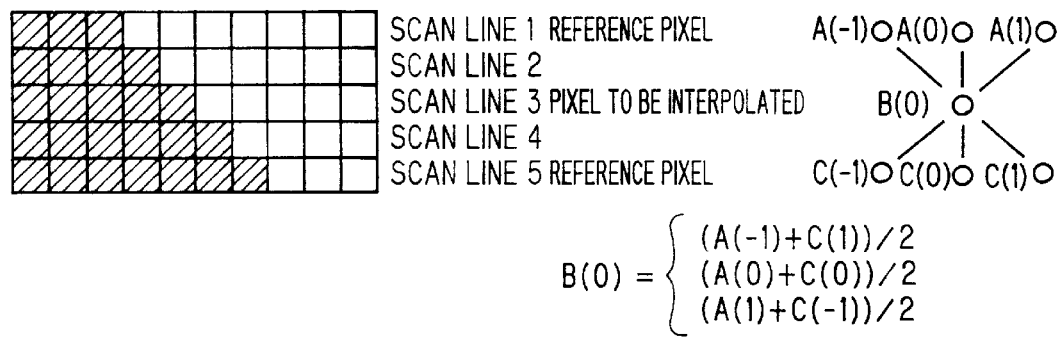
FIG. 5 is a diagram explaining a prior method of interpolation in which the correlation between pixels which are laid in oblique directions from a pixel to be interpolated are evaluated.
Figure 6:
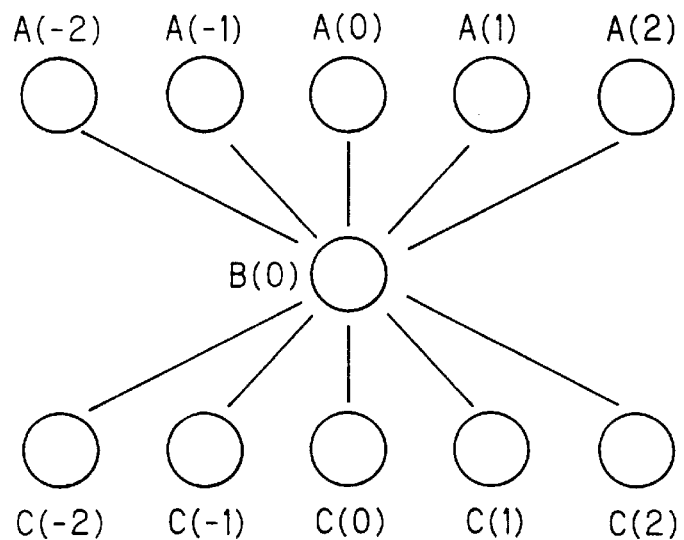
FIG. 6 is an illustration for explaining a five-direction interpolating method.
Figure 7:
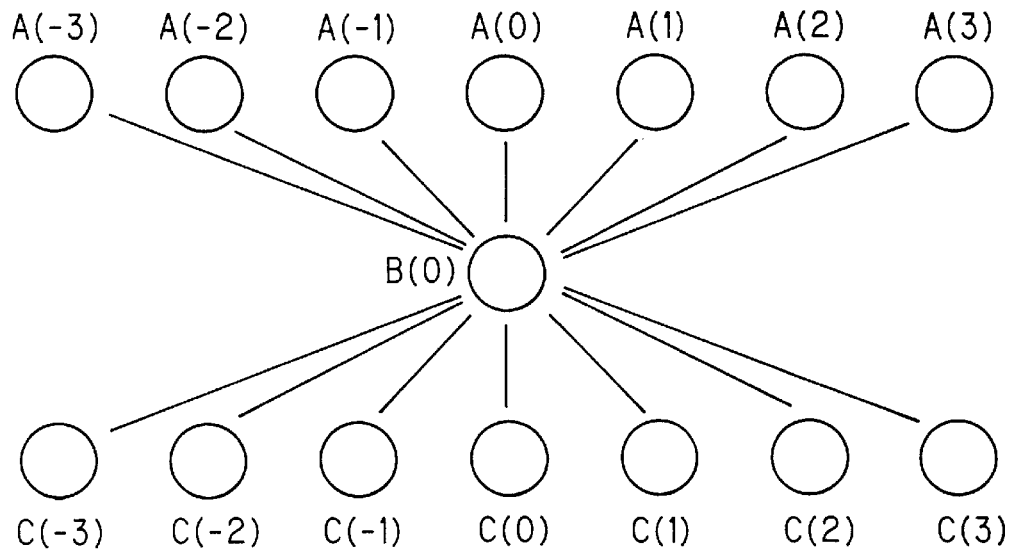
FIG. 7 is an illustration for explaining a seven-direction interpolating method.
Figure 8:
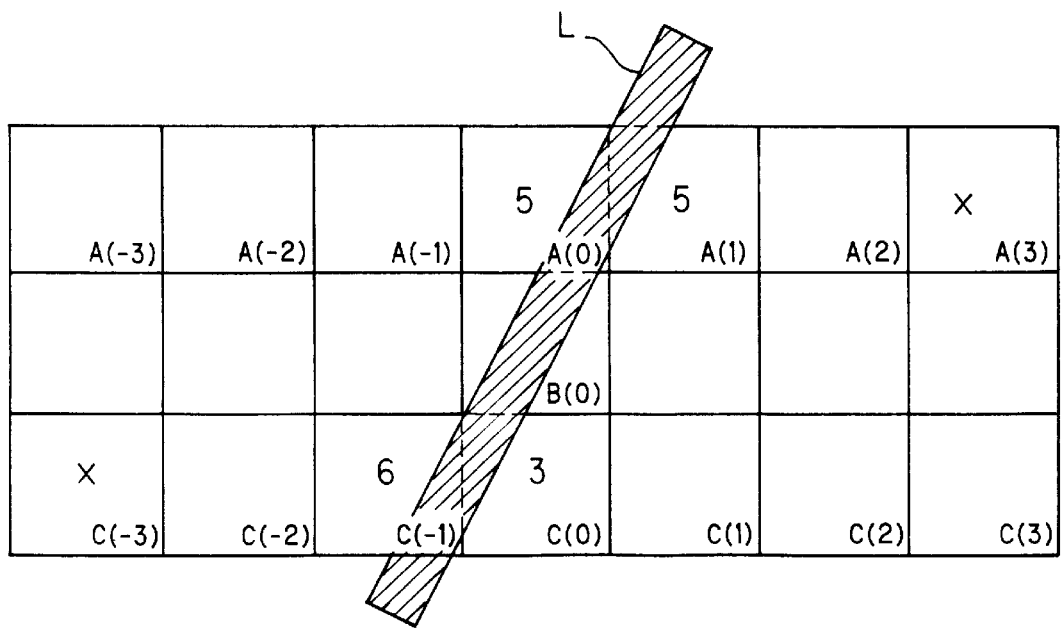
FIG. 8 is a reference diagram relating to the judgment for selecting the direction for interpolation based on correlations.
Figure 9:
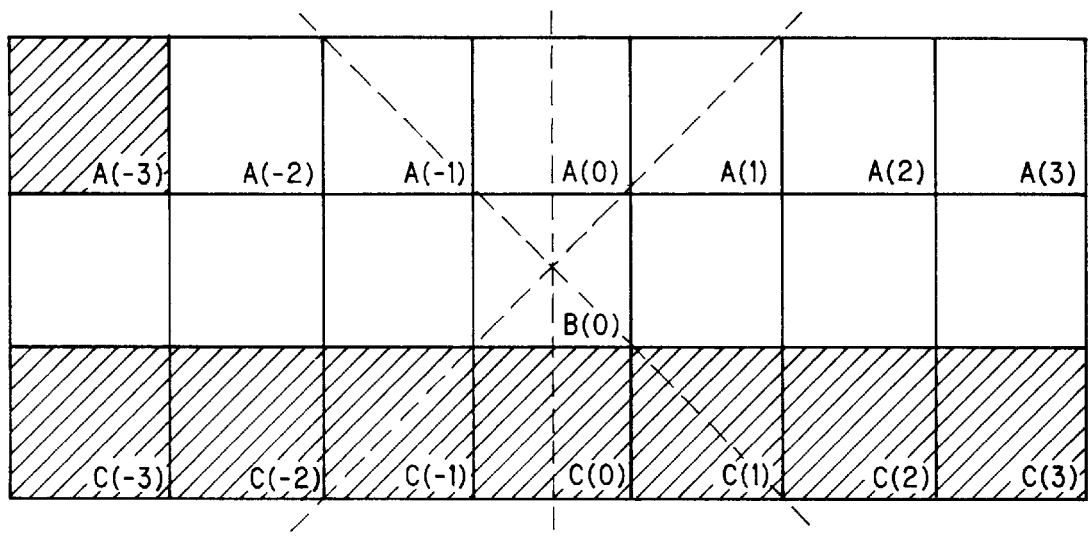
FIG. 9 is a reference diagram relating to the judgment for selecting the direction for interpolation based on correlations.
Figure 10:
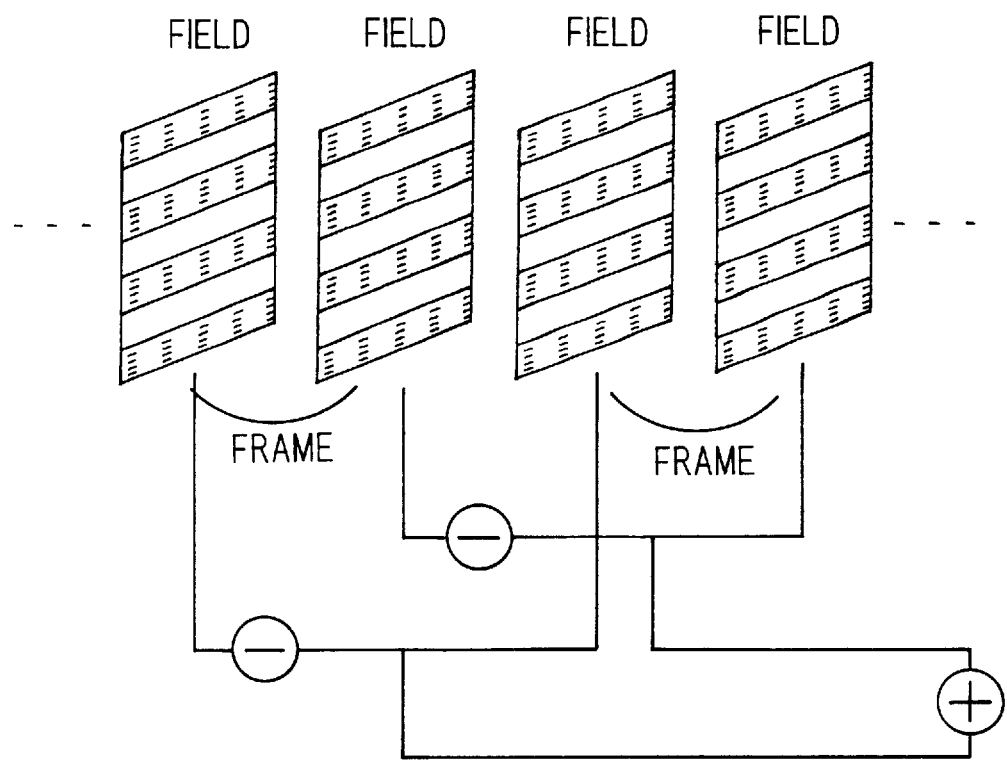
FIG. 10 is an illustration for explaining a method of detecting movement using two frames of data in order to explain a conventional technique.
Figure 11:
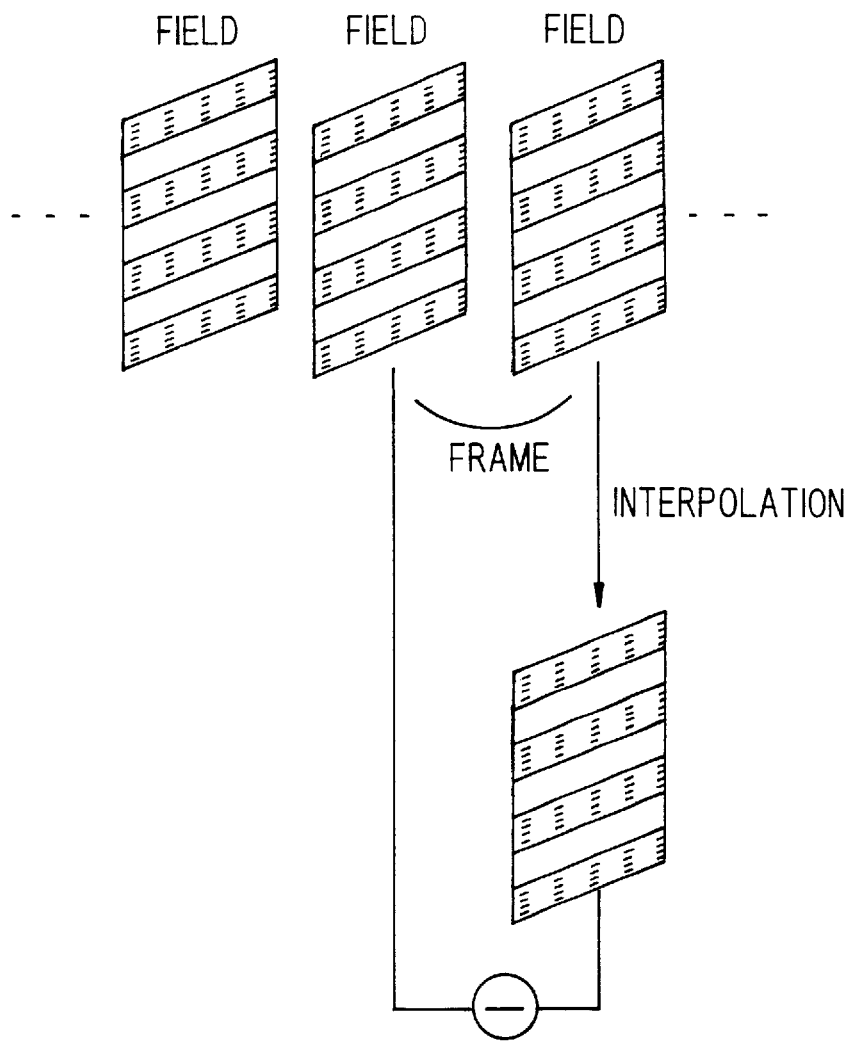
FIG. 11 is an illustration for explaining a method of detecting movement using a single frame of data in order to explain a conventional technique.
Figure 12:
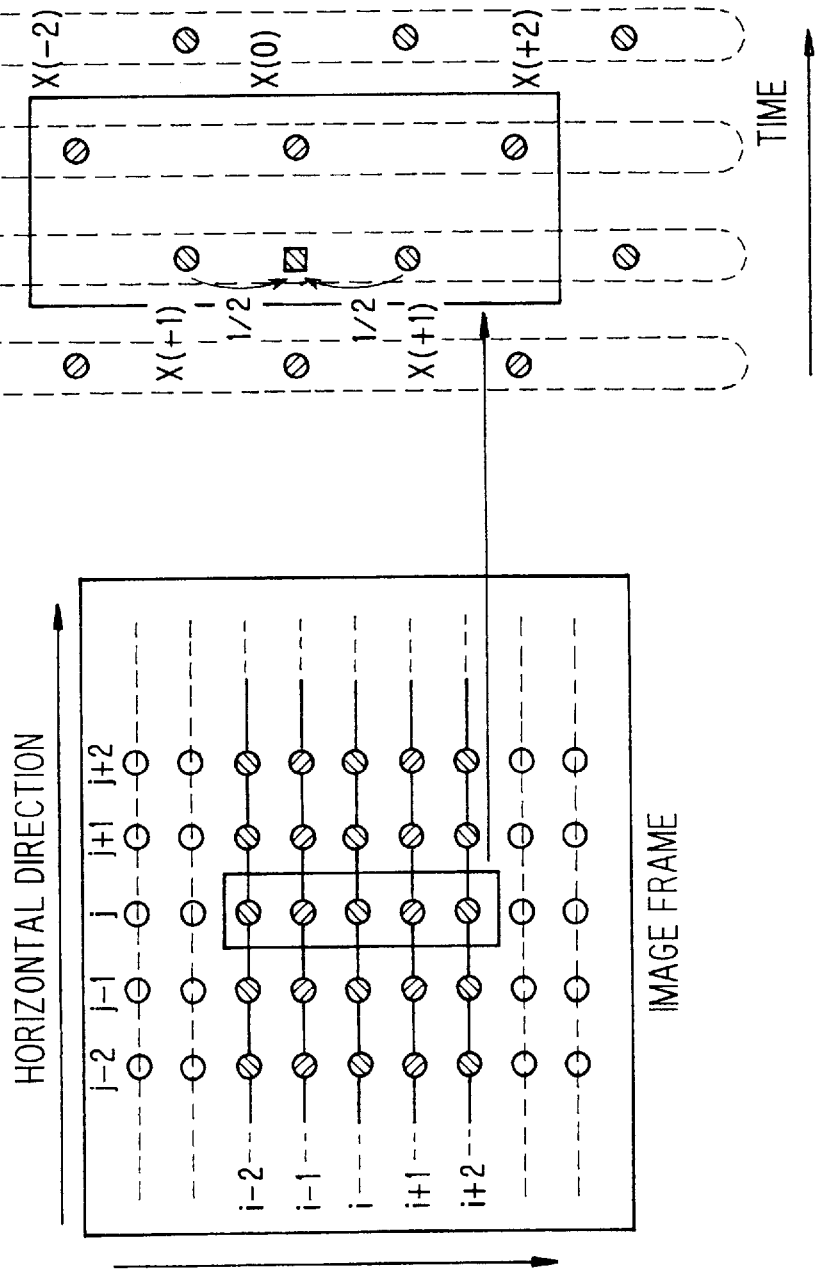
FIG. 12 is an illustration for explaining how the data of pixel for movement detection is composed in a method of detecting movement using a single frame of data in order to explain a conventional technique.
Figure 13:
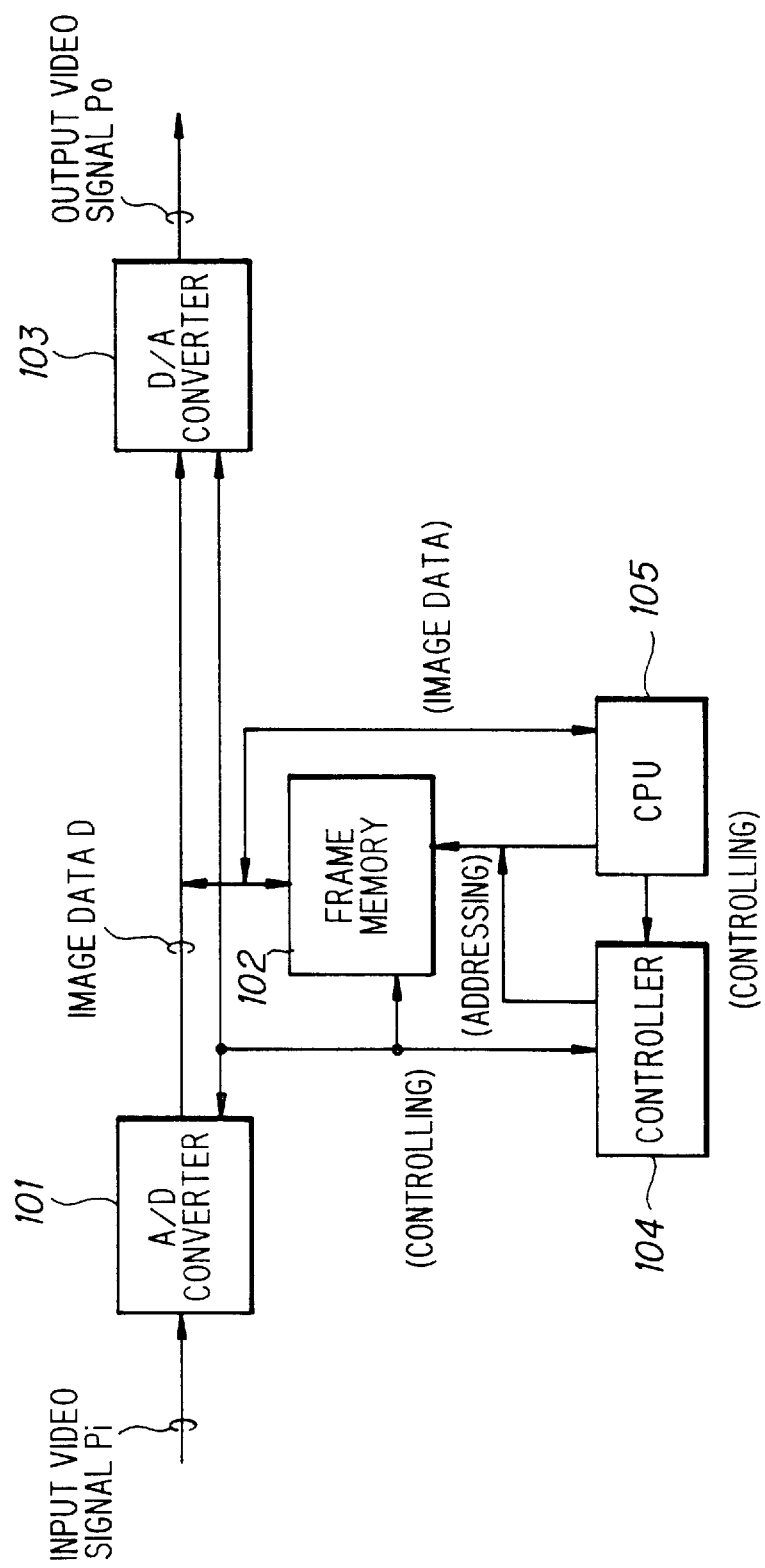
FIG. 13 is a block diagram showing a configuration of an image data interpolating apparatus in accordance with the embodiment of the invention.
Figure 15:
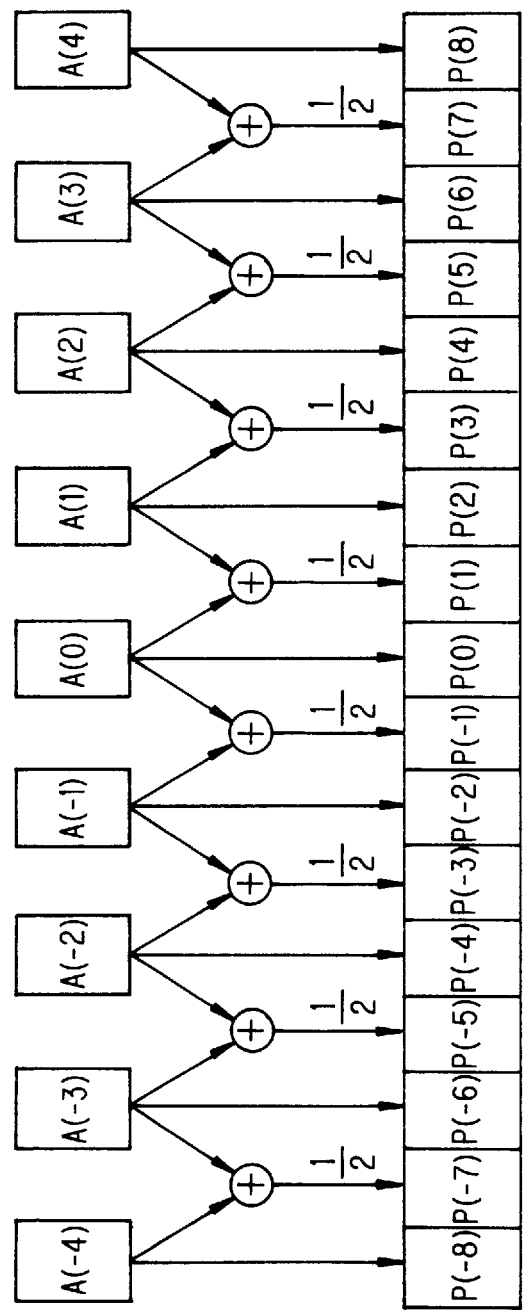
FIG. 15 is a diagram for explaining a procedure for obtaining reference image data by an image data interpolating apparatus in accordance with the embodiment of the invention.
Figure 16:
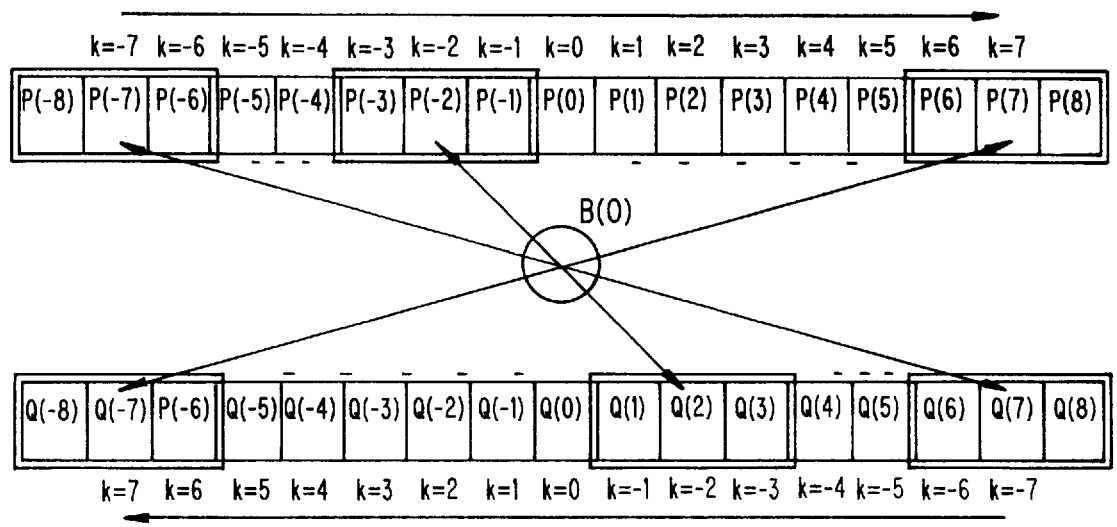
FIG. 16 is a diagram for explaining a method of calculating correlational values which is performed by an image data interpolating apparatus in accordance with the embodiment of the invention.
Figure 17:
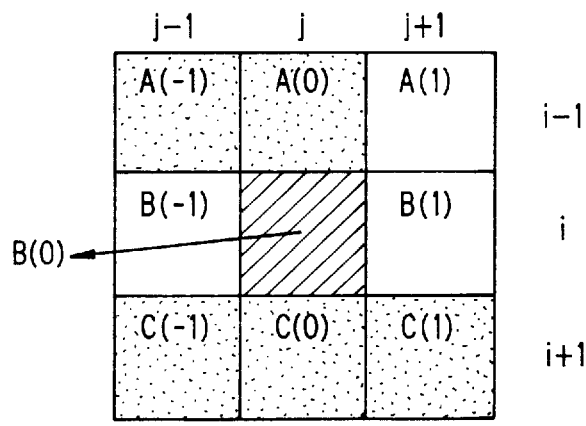
FIG. 17 is an illustration for explaining erroneous interpolation which is caused by an image data interpolating apparatus in accordance with the embodiment of the invention.
Figure 18:
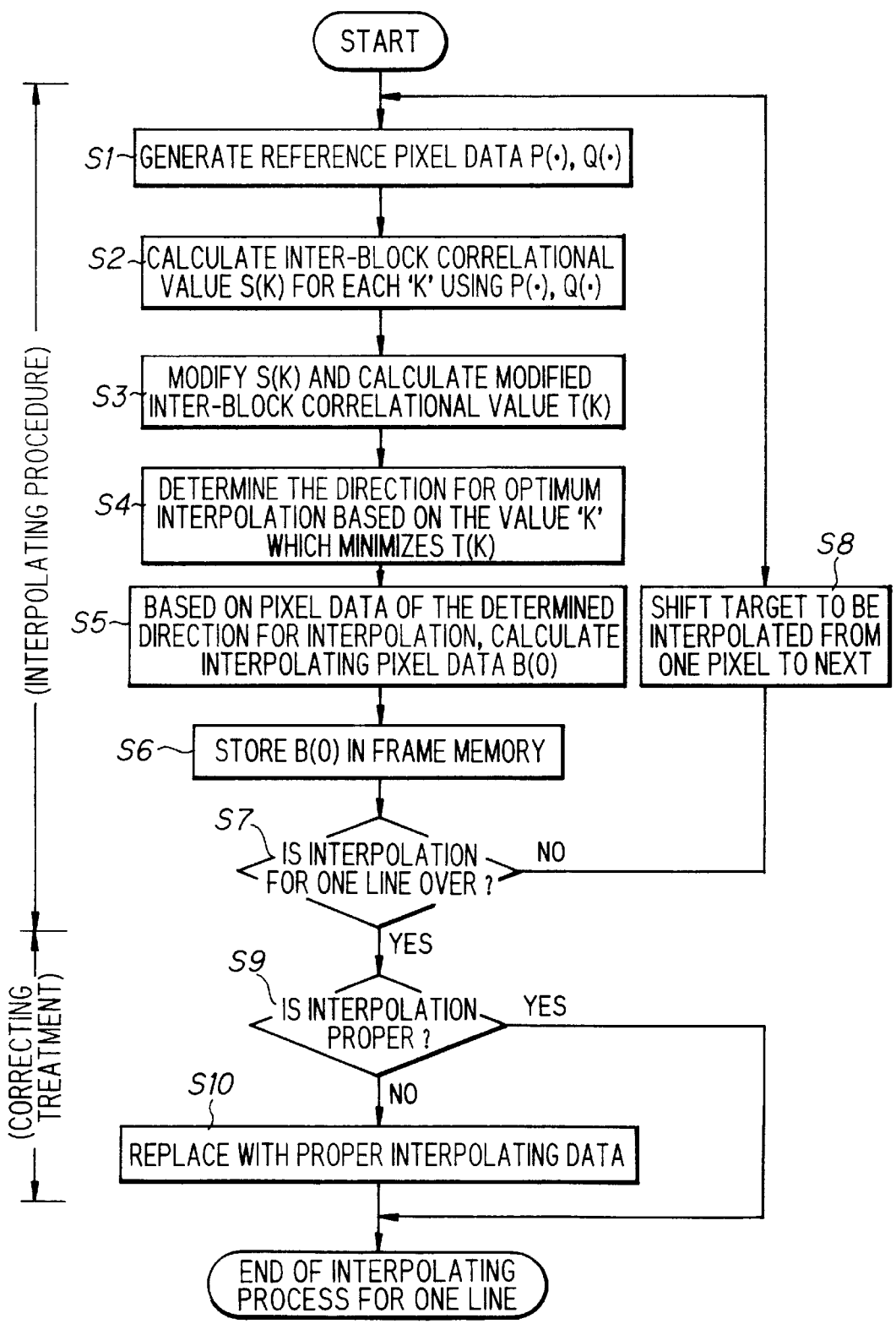
FIG. 18 is a flowchart for explaining the flow of the interpolating procedure and the correcting treatment which are performed by an image data interpolating apparatus in accordance with the embodiment of the invention.

An image data interpolating apparatus and a method of interpolation in accordance with an embodiment of the invention will be described with reference to FIGS. 13 through 16. FIG. 13 is a block diagram showing a configuration of an image data interpolating apparatus in accordance with the embodiment of the invention. FIG. 14 is an image data arrangement view showing the layout of pixels of data around a pixel to be interpolated. FIG. 15 is a diagram for explaining a procedure of horizontal interpolation for obtaining reference image data from the image data shown in FIG. 14. FIG. 16 is a diagram for explaining a method of calculating correlational values from the reference image data shown in FIG. 15. FIG. 17 is an illustration for explaining erroneous interpolation in image data. FIG. 18 is a flowchart for explaining the flow of the interpolating procedure of the invention.

First, as shown in FIG. 13, the image data interpolating apparatus of this embodiment includes: an A/D converter 101 receiving an input video signal $P_i$ and digitizing it to produce image data D; a frame memory 102 storing image data D for one frame digitized through A/D converter 101; a D/A converter 103 performing D/A conversion of image data D transferred from frame memory 102 under the command of an aftermentioned controller to generate an output video signal $P_o$; a controller 104 controlling the operations of A/D converter 101, D/A converter 103 and frame memory 102 under the control of an aftermentioned CPU; and a CPU 105 performing the evaluation of correlations in image data D which has been digitized through A/D converter 101 and stored in frame memory 102, and controlling the operations of frame memory 102 and controller 104.

Here, description will be made on the assumption that image data D obtained by the digitizing input video signal $P_i$ is luminance data.

CPU 105 incorporates a RAM for storing the correlation evaluating data and a ROM in which a control program is stored.

Next, the method of interpolation and the operation of the image data interpolating apparatus in accordance with the embodiment thus configured will be described with reference to FIGS. 13 through 18.

This image data interpolating apparatus generates pixel data of lines '..., i−2, i, i+2, ...' based on the pixel data of lines '. . . , i−1, i+1, . . . ' which has been already present in one field image. For simplicity of the description, a case where pixel data B(0) (to be referred to as interpolating pixel data) at a pixel located at row 'i' and column 'j' (to be referred to as an interpolated pixel) in FIG. 14 is generated to perform the interpolation, will be described following the flowchart shown in FIG. 18.

First, in FIG. 13, inputted video signal $P_i$ is converted into image data D of digital data by means of A/D converter 101. From converted image data D, image data D for one frame is inputted into frame memory 102 under the command of controller 104.

Of the inputted image data for one frame, frame memory 102 stores the image data for the first field into the memory locations corresponding to odd-numbered line addresses and the image data for the second field into the memory locations corresponding to even-numbered line addresses.

Next, CPU 105 shown in FIG. 13 reads out pixel data A(−1) to A(4) on line 'i−1' shown in FIG. 14, from frame memory 102. Then, image data which is obtained by averaging the image data of pixels adjacent to each other is inserted between the two neighboring pixels in question, as shown in FIG. 15, so that reference pixel data P(−8) to P(8) can newly be produced. In the similar manner, from pixel data C(−4) to C(4), reference pixel data Q(−8) to Q(8) can be obtained (Step S1).

Specifically, the following calculations are made and the result is stored into RAM in CPU 105:

$$P(k)=A(k/2) \ (k=-8,-6,-4,-2,0,2,4,6,8)$$

$$P(k)=\{A((k-1)/2)+A((k+1)/2)\}/2 (k=-7,-5,-3,-1,1,3,5,7)$$

$$Q(k)=C(k/2) \ (k=-8,-6,-4,-2,0,2,4,6,8)$$

$$Q(k)=\{C((k-1)/2)+C((k+1)/2)\}/2 (k=-7,-5,-3,-1,1,3,5,7).$$

The procedure of preparing reference pixel data P(−8) to P(8) and Q(−8) to Q(8) from pixel data A(−1) to A(4) and C(−1) to C(4) is termed as a horizontal interpolating procedure.

Next, reference pixel data P(.) and Q(.) thus obtained by the horizontal interpolating procedure is divided into blocks each having three consecutive pieces of image data as shown in FIG. 16. Based on the sum of the differences between the reference pixel data partitioned in blocks, an inter-block correlational value S(k) is calculated for each k (Step S2). Specifically, correlational value S(k) is determined by the following calculation:

$$S(k)=|P(k-1)-Q(-k-1)|+|P(k)-Q(-k)|+|P(k+1)-Q(-k+1)| (k=-7,-6,-5,-4,-3,-2-1,0,1,2,3,4,5,6,7)$$

From each inter-block correlational value S(k), another calculation is made based on the following formula to obtain a modified inter-block correlational value T(k) (Step S3):

$$T(k)=\alpha(k)S(k)+\beta(k) \ (k=-7,-6,-5,-4,-3,-2-1,0,1,2,3,4,5,6,7).$$

Then, the value of 'k' which minimizes this modified inter-block correlational value T(k) is determined as to indicate the direction for the optimum interpolation (Step S4).

Here, correcting coefficients $\alpha(k)$ and $\beta(k)$ which were introduced to obtain modified inter-block correlational value T(k) from inter-block correlational value S(k) are correcting values which increase with the augment of the absolute value of 'k'. This feature is to assure that if two or more inter-block correlational values S(k) for different values of k are equal to one another or have little difference, the 'k' which is closer to zero can preferentially be selected to determine the direction for interpolation.

Further, even when there is a less correlation, inter-block correlational value S(k) obtained by partitioning the reference pixel data into blocks of three segments will present a much greater value than the correlational value obtained by the pixel-by-pixel comparison. Therefore, it is also possible to appropriately chose oblique directions for interpolation and select directions having gentle gradients even when correcting coefficients $\alpha(k)$ and $\beta(k)$ are determined so that the directions closer to the vertical direction can be selected more preferentially for interpolation. The number of reference pixel data to be partitioned in a block when inter-block correlation value S(k) is calculated, should not be limited to three, but can be set appropriately, as required.

Thus obtained 'k' which will impart the most preferable direction for interpolation is used to obtain interpolating pixel data B(0) as follows (Step S5):

$$B(0)=(P(k)+Q(-k))/2.$$

This interpolating pixel data value B(0) is stored in the memory location at a predetermined address, which corresponds to the interpolated pixel designated at row 'i' and column 'j' shown in FIG. 14, in frame memory 102 (Step S6).

In the similar manner to the above, the target pixels to be processed are successively changed one by one to determine all the interpolating pixel data for the pixels on the line 'i' in FIG. 14. The thus obtained data is stored into corresponding memory locations at predetermined addresses, whereby interpolating pixel data for one line can be obtained (Step S7→Step S8→Step S1→Step S7). Here, the readout of pixel data A(.) and C(.) from frame memory 102 and the horizontal interpolating procedure, which both are required for the interpolation, should be performed as required whenever the target changes from one pixel to another.

Even when a frame image has been produced by the above interpolating procedure (Step S1 to Step S8), it can not be said that the interpolated result is completely correct, and there is still a bare possibility of erroneous interpolation occurring. Next, description will be made on the measure of correction (to be referred to as a correcting treatment) against the erroneous interpolation which might occur in the slightest degree. This correcting treatment is composed of two steps:—a step for examining the image data of the interpolated pixels and identifying the pixels which have been interpolated with erroneous data (Step S9) and a step for replacing the image data determined as interpolation errors with proper interpolating data (Step S10).

Initially, the step for the detection of interpolating pixel data that is produced due to erroneous interpolation will be explained. Usually, the image of a subject picked up by a visual sensor such as a camera etc., if it has a minute pattern like polka dot, tends to become blurred to some degree around pixels located at boundaries of the pattern elements due to the characteristics of the optical system and the imaging element used in the visual sensor. However, if there occurs erroneous interpolation, the boundary will become extremely sharp since it is synthetically composed by the interpolating procedure. The correcting treatment described hereinbelow makes use of this feature and a judgment of whether erroneous interpolation has occurred will be made based on this feature.

Now, suppose that interpolating pixel data B(0) designated at row 'i' and column 'j' in the pixel data array shown in FIG. 17 is a pixel data produced due to erroneous interpolation. Description will be made on the case where the interpolating pixel data B(0) is corrected. In the figure, the pixel data of line 'i' is obtained from the interpolating procedure, and the correcting treatment to be explained hereinbelow will be performed for only the pixel data of the lines which have been obtained by the interpolating procedure.

CPU 105 shown in FIG. 13 reads out pixel data A(−1) to A(1), B(−1) to B(l), and C(−1) to C(1) from frame memory 102 and calculates an evaluation value 'd' by the formula as follows:

$$d=|-A(0)+2xB(0)-C(0)|x|-B(-1)+2xB(0)-B(1)|$$

$$x|-A(-1)+2xB(0)+C(1)|x|-A(1)+2xB(0)+C(-1)|.$$

Here, evaluation value 'd' is a product of the absolute values of the second order derivatives of the image data in the vertical, horizontal, upper-left to lower-right, and upper-right to lower-left directions. This value represents the extent to which interpolating pixel data B(0) is isolated from the pixel data of the surrounding pixels.

In general, if erroneous interpolation occurs as shown in FIG. 17, the level of the image data will become remarkably different from that of the surrounding pixels. When this occurs, evaluation value 'd' presents an extremely large value. Therefore, the pixel data whose evaluation value 'd' is in excess of a predetermined threshold, can be determined as an interpolation error, thus making it possible to easily judge the fairness of the pixel data obtained by the interpolating procedure (Step S9). This judgment will be referred to as an interpolation fairness judgment.

Although the capability of detecting interpolation errors slightly degrades, the following eight-directional laplacian may be used as an evaluation value 'd':

$$d=|8xB(0)-A(-1)-A(0)-A(1)-B(-1)-B(1)-C(-1)-C(0)-C(1)|$$

Next, if an interpolation error is detected in the stage of the interpolation fairness judgment and the interpolation is determined to be improper, the interpolating pixel data which has been determined erroneous is replaced by the image data lying in the vertical direction (Step S10).

Namely, the interpolated image data of the interpolated pixel which has been detected as erroneous is replaced by the interpolating data obtained by the following formula:

$$B(0)=(A(0)+C(0))/2.$$

In this case, the interpolating data is the mean value of the pixel data of the pixels above and below the interpolated pixel that has been detected as erroneous.

Similarly, all the pixel data of line 'i' shown in FIG. 14 which has been generated during the interpolating procedure is made to undergo the correcting treatment (Step S9 to Step S10). In this way, it is possible to obtain the image data for one line in which interpolation errors generated during the interpolating procedure (Step S1 to Step S8) are all corrected. In the same manner, the interpolating procedure and the correcting treatment as described above will be repeated for every other line to be interpolated until image data for one frame is finally generated from the image data for one field and the resulting image data is imparted to frame memory 102. In this way, the image data for one frame in which erroneous interpolation has been corrected and therefore irregularity is inconspicuous, is stored in frame memory 102.

When image data for one frame is obtained after the completion of the successive process of image data interpolation which consists of the interpolating procedure and the correcting treatment, CPU 105 instructs controller 104 to control frame memory 102 and D/A converter 103 so that the image data for one frame stored in frame memory 102 is converted into output video signal $P_0$ by means of D/A converter 103. The thus converted signal is outputted from this apparatus to the outside.

Although in the description of the above correcting treatment, the interpolated image data for one field was processed line by line by alternating the interpolating procedure and the correcting treatment, it is also possible to correct all the pixel data for one field at a time after the completion of the interpolation. Further, if a high-quality image is obtained by only the interpolation, the correcting treatment may be omitted.

In the description of the horizontal interpolation in which the reference pixel data to be used for the interpolating procedure is generated from the original pixel data, although the reference pixel data was prepared by inserting the mean values of two adjacent data in between, the number of data to interpolate the pixel data in the horizontal interpolating procedure can be increased as many as desired. Further, for simplify of the procedure, it is also possible to directly subject pixel data A(.) and C(.) to the similar treatment to determine the direction for interpolation without preparing reference pixel data P(.) and Q(.).

Moreover, although CPU 105 constituting the image data interpolating apparatus of this embodiment is adapted to execute the calculations for evaluating the correlations in accordance with the program stored in the incorporated ROM, the gist of the invention will not be limited to this calculation executing means. That is, the calculation may be made by the other hardware or, it is also possible to use a software installed in a personal computer or workstation in order to perform all the interpolating procedure.

In the description of the above embodiment, although luminance data was assumed as the image data, when the chrominance signal for the color image is interpolated, it may be interpolated by the data lying in the same direction for interpolation as determined for the luminance data.

In accordance with the image data interpolating apparatus of the above embodiment, since P(.) and Q(.) which are obtained by inserting the mean values of the pixel data of two adjacent pixels in between, are evaluated as the reference pixel data in order to determine the direction for interpolation, it is possible to reduce the possibility that erroneous pixel data which is irrelevant to the actual edge might be selected from the reference pixel data for interpolation. Further, since conditions of the pixels around a pixel to be interpolated is examined by every block of three proximal pixels of data as a unit to evaluate the correlations of the surrounding pixels, it is possible to reduce erroneous interpolation compared to the case where the difference in the data of two pixels immediately above and below the pixel to be interpolated is simply evaluated to determine the correlation.

In accordance with the image data interpolating apparatus of this embodiment, the direction for interpolation is determined based on evaluation function T(k) which is modified in such a way that more priority will be give to the image data lying in the vertical direction. Therefore, if no correlation can be found in any direction, or even when the difference in the pixel data between two pixels lying in the direction which is not a fair direction for interpolation, takes the minimum value which is just slightly smaller than the difference in the pixel data between two pixels in the proper direction for interpolation, the image data closer to the vertical direction will become more likely to be used for interpolation. As a result, the pixel data of the pixels closer to the target pixel can be used for interpolation, thus it is possible to reduce the occurrence of erroneous interpolation.

Further, in accordance with the image data interpolating apparatus of this embodiment, although D/A converter 103 is connected on the back side of frame memory 102 to function as a still image display apparatus, when a printer engine is connected in place of this D/A converter 103, it is possible to realize a video printer capable of printing high-quality images.

Next, description will be made of another embodiment of the invention, or an image data interpolating apparatus having a movement detecting means for separating moving portions from stationary portions within an image.

Figure 19:
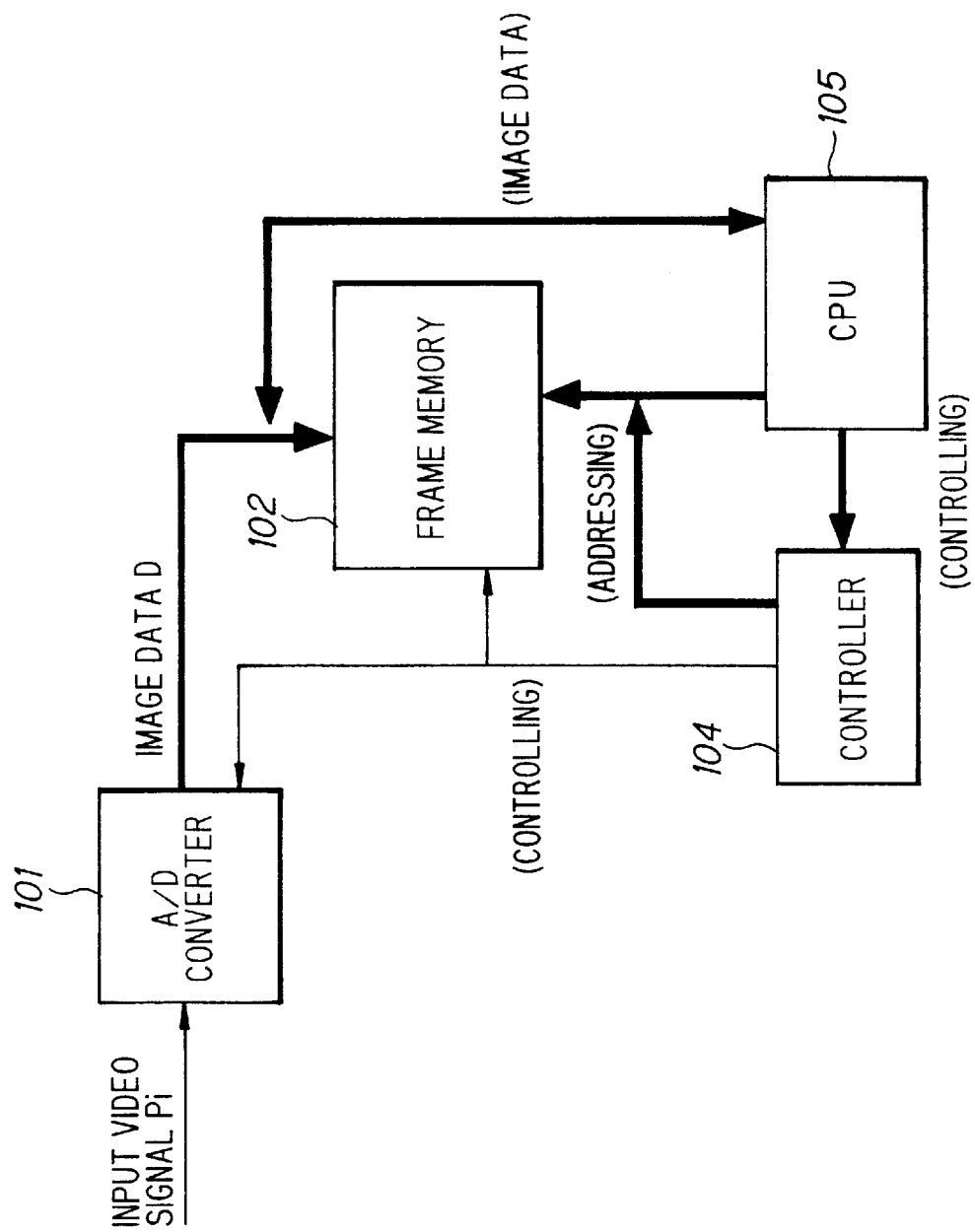
FIG. 19 is a block diagram showing a configuration of the still image forming apparatus using a data interpolating apparatus in accordance with the embodiment of the invention.
Figure 20:
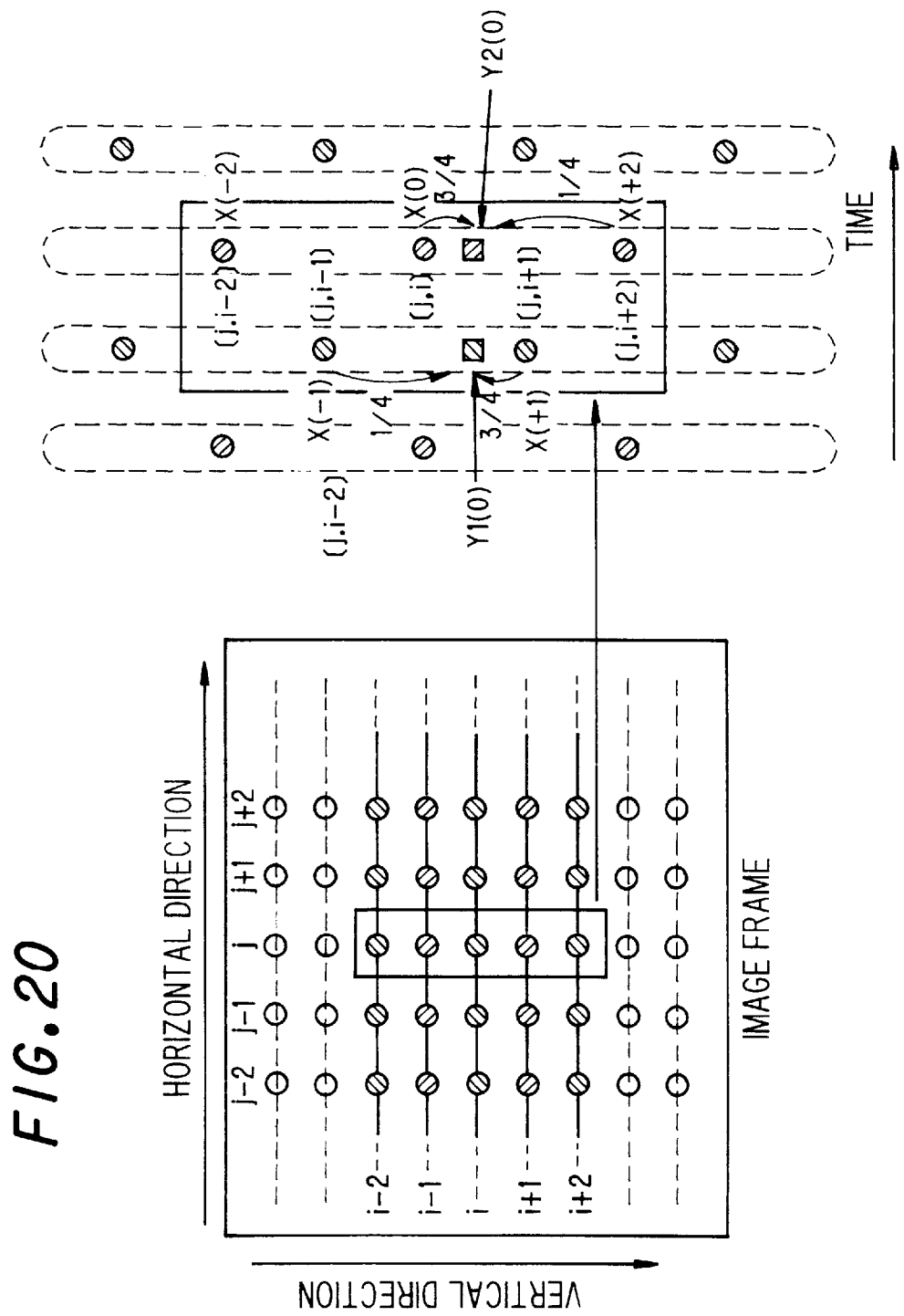
FIG. 20 is an illustration for explaining how the data of pixels for detecting the movement around a pixel, which is detected by the image data interpolating apparatus in accordance with the embodiment of the invention, is composed.
Figure 21:
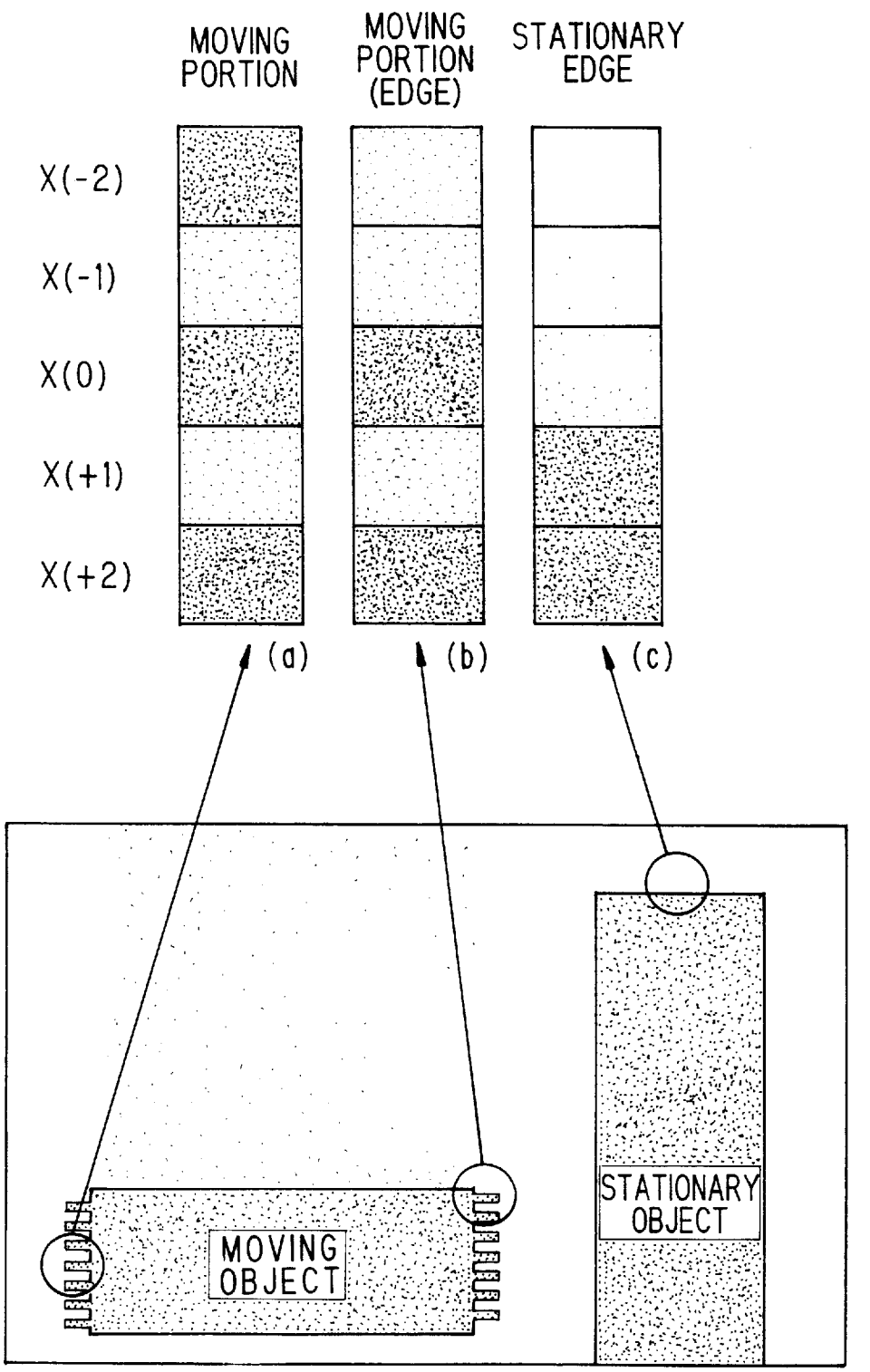
FIG. 21 is an illustration for explaining how the threshold for detecting the movement of pixels around a pixel, whose movement is detected by the image data interpolating apparatus in accordance with the embodiment of the invention, is composed.
Figure 22:
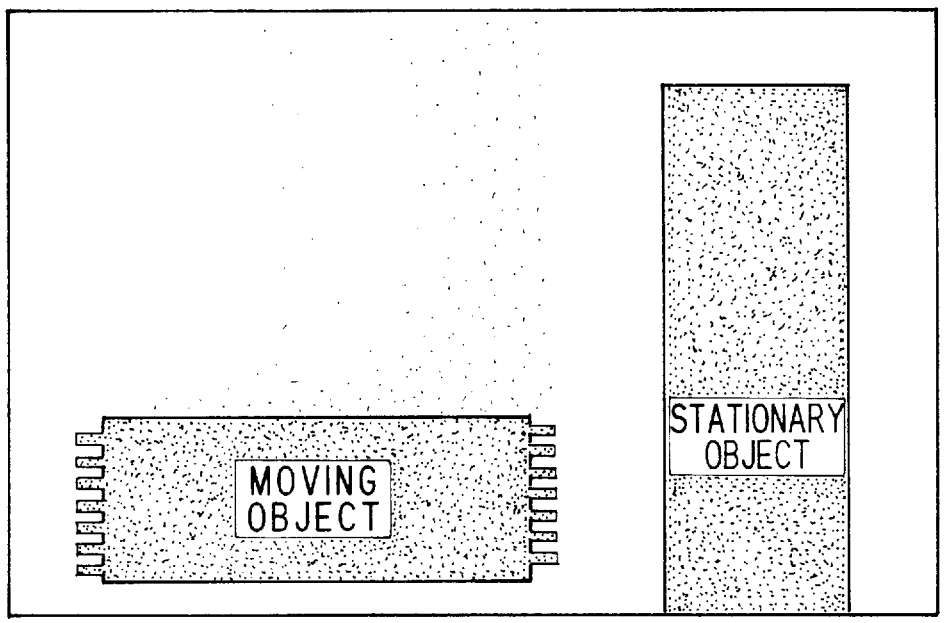
FIG. 22 is an illustrative view showing a frame of data which is obtained by simply combining two fields of data which have a moving portion.
Figure 23:
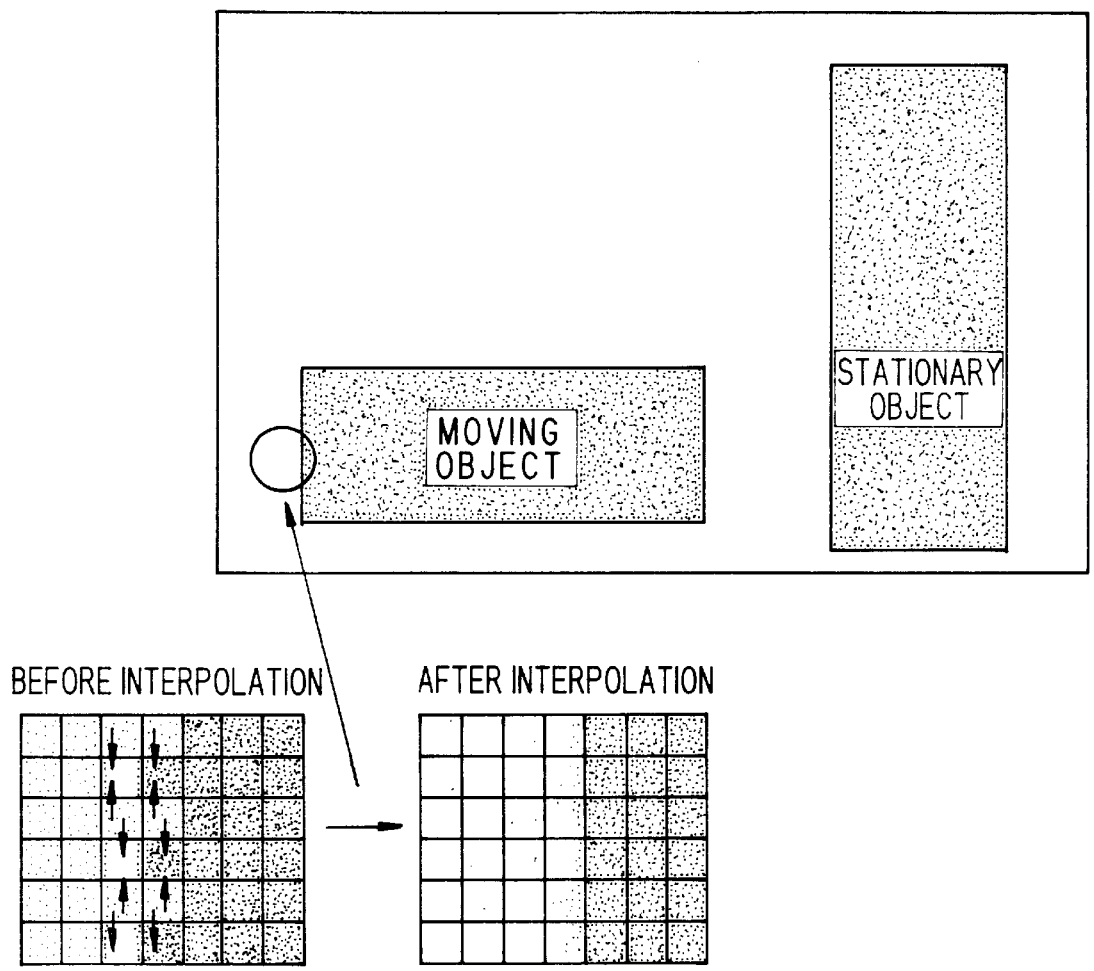
FIG. 23 is an illustrative view for explaining a composing method of a frame of data wherein the data of moving portions is produced by using only one of the two fields.
Figure 24:
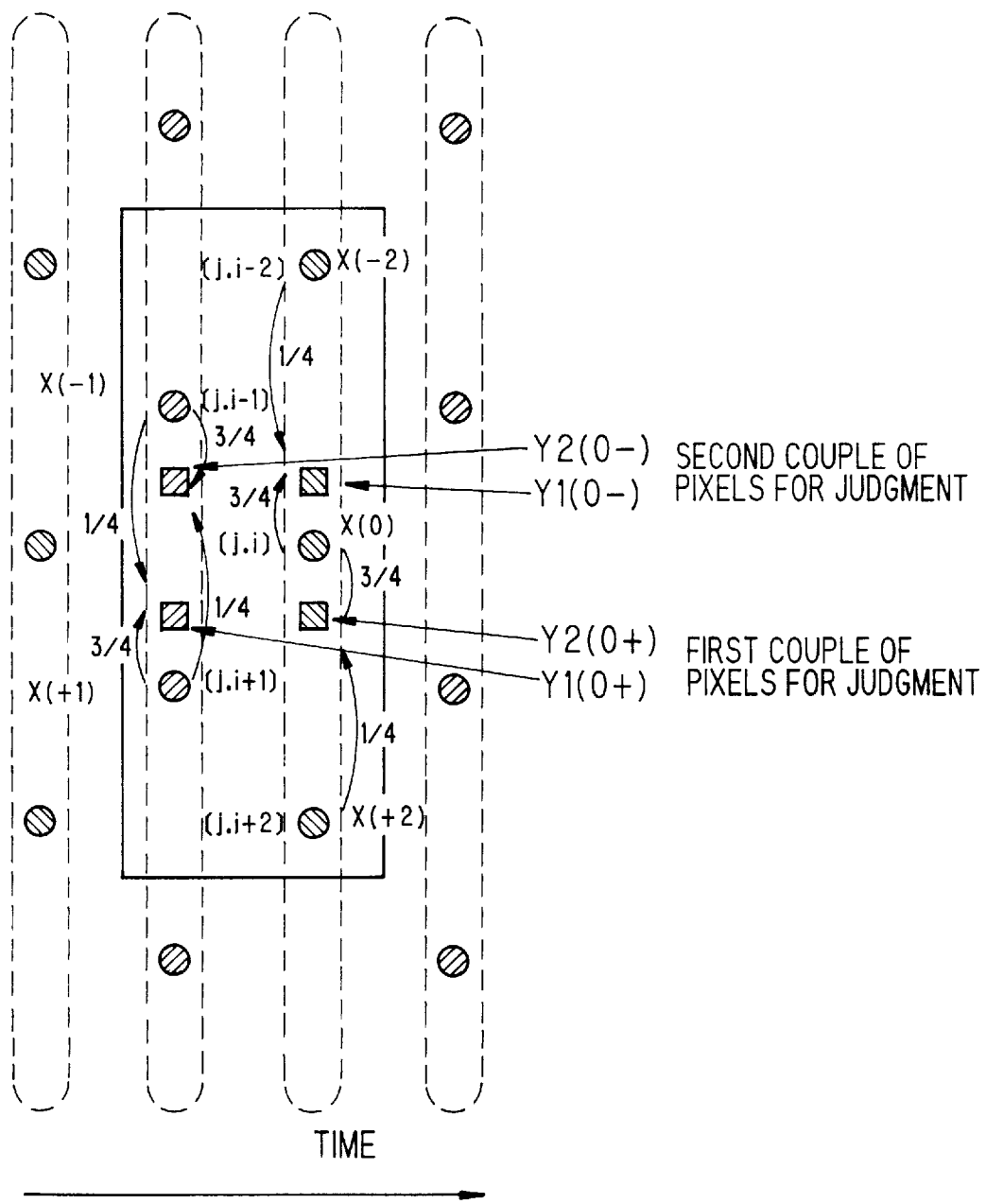
FIG. 24 is a view for illustrating a method of composing couples of pixels, which are used for the judgment of detecting movement, both above and below the pixel to be interpolated.

Referring to FIGS. 19 to 24, the image data interpolating apparatus of this embodiment of the invention will be described. FIG. 19 is a block diagram showing a configuration of the image data interpolating apparatus in accordance with the embodiment of the invention. FIG. 20 is an illustrative view showing pixels around a pixel whose movement is detected. FIG. 21 is an illustrative view for explaining a varying component of a threshold for evaluating the pixels around a pixel whose movement is detected. FIG. 22 is an illustrative view showing a frame of data which is obtained by simply combining two fields of data which have a moving portion. FIG. 23 is an illustrative view for explaining a composing method of a frame of data wherein data of moving portions is produced by interpolating only one of the two fields. FIG. 24 is a view for illustrating a method of composing couples of pixels, which are used for the judgment of detecting movement, both above and below the pixel to be interpolated.

First, as shown in FIG. 19, the image data interpolating apparatus of this embodiment includes: an A/D converter 101 receiving an input video signal $P_i$ and digitizing it to produce image data D; a frame memory 102 storing image data D for one frame which has been digitized through A/D converter 101; a controller 104 controlling the operations of A/D converter 101 and frame memory 102 under the control of an aftermentioned CPU; and a CPU 105 performing calculative processing for checking and determining the movement of image data D which has been digitized and stored in frame memory 102 and controlling the operations of frame memory 102 and controller 104. Here, CPU 105 incorporates a RAM for storing correlational operation data and a ROM in which a control program is stored.

Next, the operation of the image data interpolating apparatus in accordance with the embodiment thus configured will be described with reference to FIGS. 19 through 24. Referring to FIG. 20, this image data interpolating apparatus, based on the first field image, or more specifically, the pixel data of lines '..., i−1,...', determines whether the second field image, or the pixel data of lines '..., i−2, i, i+2,...' has some moving points. Here, the explanation will be made of the case where it is judged whether pixel data of a pixel located at row 'i' and column 'j' (shown in FIG. 20) is a moving point or stationary point. First, in FIG. 19, an inputted video signal $P_i$ is converted into image data D of digital data by means of A/D converter 101. From converted image data D, image data D for one frame is inputted into frame memory 102 under the command of controller 104.

From the inputted image data for one frame, frame memory 102 stores the image data for the first field into the memory locations corresponding to odd line addresses and the image data for the second field into the memory locations corresponding to even line addresses. Next, CPU 105 shown in FIG. 19 reads out the input image data at five points X(−2) to X(+2) shown in FIG. 20 from frame memory 102. Here, X(−2) to X(+2) correspond to the frame data of pixels designated by [j,i−2], ... [j, i+2]. Then, the following calculations will be made in CPU 105. First, image data Y1(0) and Y2(0) whose positions are shifted in the vertical by ¼ pixel as shown in FIG. 20 are yielded within respective fields by intra-field linear interpolation. For example, image data Y1(0) is yielded based on X(1) and X(−1) in a weight ratio of 3:1 (this corresponds to the condition a=¼ in the first invention) and shifted by ¼ pixel from X(1). Similarly, image data Y2(0) is yielded based on X(0) and X(+2) and shifted by ¼ pixel from X(0).

This can be represented by the following formulae:

$$Y1(0)=(¼)X(-1)+(¾)X(+1)$$

$$Y2(0)=(¾)X(0)+(¼)X(+2).$$

Both Y1(0) and Y2(0) are located at the same point in each frame. That is, two images having the same phase and the same frequency range with respect to the vertical direction are composed from two fields of data. Subsequently, the absolute value 'd' of the difference between Y1(0) and Y2(0) is calculated. The value 'd' can be written as:

$$d=|Y1(0)-Y2(0)|.$$

This 'd' will be compared to a predetermined movement detecting threshold 'th'. If d>th, then the pixel [j,i] in FIG. 20 is determined as a moving point. Otherwise, the pixel is determined as a stationary point.

In the conventional method, for detecting movement, only one of the two fields is evaluated by simple interpolation to compose the frame of data. That is, Y1(0) and Y2(0) are taken as follows:

$$Y1(0)=(½)X(-1)+(½)X(+1)$$

$$Y2(0)=X(0).$$

Therefore, the frequency range of Y1(0) is different from that of Y2(0) and this can be considered as the cause of erroneous detection.

Since two composed fields having the same phase and the same frequency range as stated above is used for Y1(0) and Y2(0) of the invention, 'd' can be detected exactly all the time without being affected by the statistic nature of the image.

The aforementioned movement detecting threshold 'th' is defined as a sum of two components as follows:

$$th=th0+th1.$$

In general, the difference between the fields will become large in moving portions, namely, the 'd' will become large, thus the point will be determined as a moving point. However, even if a point belongs to a stationary portion, the observed pixel is near the edge of a stationary object, the 'd' will become large and therefore will be erroneously determined as a moving point. To deal with this situation, 'th' is divided into two parts, i.e., th0 and th1. This 'th0' is a fixed component set as a limit below which the image data cannot be recognized as a visual moving point.

The value th1 is a non-negative variable component and has a feature that as long as the observed point [j,i] or X(0) lies in a horizontal edge portion, the value will become large. Here, th1 is give as follows:

$$th\ 1 = k\ \text{rnd}\ (\max(\alpha, \beta))\ (\text{rnd}(.): \text{rounding})$$

where $$\alpha = \min(|X(-2)-X(0)|, |X(0)-X(+2)|)$$

$$\beta = |X(-1)-X(+1)|.$$

In the above formula, α and β are both parameters which use the absolute values of the difference in the pixel data within respective fields, and these will become large at the horizontal edge portions which stand still. Therefore, 'th' becomes large so that X(0) becomes unlikely to be judged as a moving portion. This means that the erroneous detection can be prevented when an observed pixel lies near the edge of a stationary object. Now, the above formula will be described in detail. In FIG. 21, when X(0) is a moving portion (in FIG. 21(a)), the pixels of data which belong to the same field can be considered to be approximately equal to one another. Therefore, the difference of X(−2) and X(0), or the difference of X(0) and X(+2) will be assumed to be small. Here, when a pixel which belong to the moving portion but lies at the edge (in FIG. 21(b)), there must be a pixel which is no correlated with the moving portion, either above or below the observed pixel. Therefore, the operator 'min' is used to make α small.

On the other hand, when the data in question lies in a stationary horizontal edge portion (in FIG. 21(c)), the pixels of data which lie opposite with the boundary edge in between are less correlated even if they belong to the same field. As a result, either α or β becomes large. Illustratively in FIG. 21(c), a small value |X(−2)−X(0)| is selected for α by the function of 'min' (.), but β presents a large value |X(31 1)−X(+1)|. Thus, the greater value or β is selected. In one word, either α or β which is greater will be used. In this way, max (α,β) will become small at a moving portion, whereas it will become large at a horizontal edge portion.

Here, rnd(a) is a rounding-off operator which will omit the lower insignificant bits. When irregularities due to noise etc., contained in the image is considered, max(α,β) will not always become zero, and may affect th1 thus possibly causing the detection error. This is why the rounding step is added. A coefficient 'k' is a weighting coefficient which represents the balance between the variable portion rnd (max(α,β)) and the fixed component th0 and is selected so as to prevent the error of the moving detection and the erroneous detection of horizontal edges. CPU 105 compares 'th' with 'd', and determines that an observed pixel is a moving point if 'd' is greater than 'th' and otherwise, a stationary point.

The use of the above movement detection, enables two fields of data both having moving portions, for instance, to form a frame of still image free from blur. When there is a moving object, two fields of data is composed into a frame data without any treatment, the resulting image of the moving object will appear to be a jaggy image which is zigzagged alternately every other scan lines as shown in FIG. 22. In order to prevent this, the portion having movement, only one of the two fields will be used for interpolation to compose a frame of data as shown in FIG. 23.

Consider the case there this method of this embodiment is applied to the above data composition of a frame. In this case, when an observed pixel with data X(0) is determined as a moving point based on the method of this invention, the point [j,i] on the frame of data will be composed by interpolation using X(−1) and X(+1) of the other field than that to which X(0) belongs, in stead of using X(0). Specifically, the pixel data at [j,i] will be as follows:

X(0) is a moving point:

pixel data at $[j,i]=(X(-1)+X(+1))/2$, and if X(0) is a stationary point:

pixel data at $[j,i]=X(0)$.

Needless to say, it is also possible to perform the interpolating composition in accordance with the first embodiment which is illustrated in FIG. 18. CPU 105 will make the above calculation processing.

In this way, the target to be processed is shifted from pixel to pixel, and when all the pixels on lines '. . . , i−2, i, i+2, . . . ' have been processed completely, a high-quality still image free from blur on the frame of data can be yielded.

In the above, in one of the two fields, one interpolating pixel for movement detection was provided at a point between the scan lines which interiorly divides the pixel distance in the vertical direction at a ratio of 1:3, whereas in the other field, another interpolating pixel for movement detection was provided at a point between the scan lines which interiorly divides the pixel distance in the vertical direction at a ratio of 3:1. However, the way of taking interpolating pixels should not be limited to this. For example, the interpolating pixels may be positioned so that the pixel distance will be divided in a ratio of a:1−a where 0<a<1 and a≠0.5. There is a concern that some slight error of the movement detection might occur because the composed pixels for movement detection are formed at positions displaced from the actual pixels. To deal with this, as shown in FIG. 24, other pixels can be produced at the symmetric positions in the vertical direction to perform the same movement detection and the logical sum of the two movement detected results can be calculated.

Further, although CPU 105 constituting the movement detecting device of this embodiment is adapted to execute the calculations for movement detection in accordance with the program stored in the incorporated ROM, the gist of the invention will not be limited to this calculation executing means. That is, the calculation may be made by the other hardware or, it is also possible to use a software installed in a personal computer or workstation in order to perform all the interpolating procedure.

As has been described, in accordance with the invention, the following advantages can be obtained.

First, in accordance with the invention, since the direction for interpolation is determined by evaluating the correlation between the two blocks of reference data opposite to each other with a pixel to be interpolated in between, it is possible to determine an appropriate direction for interpolation for each pixel. Consequently, it is possible to drastically reduce erroneous interpolation in the interpolating process.

In accordance with the invention, pixel data which has been yielded erroneously is detected so that it can be replaced by the interpolating data which is produced from data of the pixels located around (adjacent to or near) the erroneous pixel data. As a result, it is possible to practically eliminate visual irregularity due to the interpolation errors which arise in the interpolating procedure.

Further, in accordance with the invention, the correlations are judged by assigning weights in accordance with the directions for interpolation, and interpolation is performed based on the result of the judgment, it is possible to perform smooth interpolation with less jaggedness for edges having more gentle sloping edges.

Moreover, in accordance with the invention, since, in order to determine the pixels of data erroneously interpolated by the interpolating procedure, the second-order derivatives or eight-directional laplacian are used to calculate the evaluation values which represent the condition of isolation of the pixel data and will become very large if the pixel data is erroneous and based on the evaluation values, judgment of whether each piece of image data obtained by the interpolation is proper is made, it is possible to easily perform the determination of interpolation errors.

In accordance with the invention based on the above configuration, since interpolation errors can be drastically reduced and it is practically possible to eliminate visual irregularity due to interpolation errors, it is possible to obtain frame data of a vary highly qualified still image from a frame of data.

Further, in accordance with the other embodiment of the invention, since a couple of field data for movement detection whose phases and frequency ranges with respect to the vertical direction are close to one another, are composed from the two fields of data of interlaced scanning, namely, the odd-numbered line field and even-numbered line field and are compared to one another, it is possible to perform the movement detection with a very high precision. In the conventional method, only one of the two fields was used to perform interpolation and therefore the frequency ranges of the two fields were different from each other, thus causing erroneous detection. Therefore, the aforementioned feature is a remarkable advantage over the conventional method.

Moreover, since in stead of the two frame scheme in which movement detection is performed by differencing two fields of the same type as stated in the prior art, one frame scheme is used in this invention, it is possible to manage to perform the operation with one frame memory. Therefore, a reduction of the cost can be expected. In accordance with the invention, since the threshold for the judgment of movement is given in the form of a sum of a variable component and a fixed component which is preset as a limit below which the image data cannot be recognized as a visual moving point, the fixed value is made predominant for the detection of moving portions. Consequently, it is possible to attain effective movement detection free from errors of the movement detection due to minutely blurred portions.

Finally, in accordance with the invention, since the threshold for the movement judgment will become large when pixels whose movements are detected lie in a horizontal edge of a stationary portion, erroneous judgment of the edge of the stationary portion as a movement portion can be prevented, thus making it possible to perform effective movement detection.

In this way, in accordance with the invention thus configured, it is possible to attain markedly exact movement detection for any types of images since errors of the movement detection due to minutely blurred portions can be prevented and since erroneous judgment of the edge of the stationary portion as a movement portion can be prevented.

What is claimed is:

1. An image data interpolating apparatus for producing one frame of data using one of two fields of data which respectively constitute pixel data on the odd-numbered scan lines and even-numbered scan lines of a frame data so that the pixel data on the even-numbered or odd-numbered scan lines of the other field will be interpolated, wherein one frame of data is yielded by interpolating one field of data by such steps which include: determining an interpolating direction on the basis of a pixel to be interpolated; and producing interpolating pixel data corresponding to the pixel to be interpolated based on the pixel data of the pixels located in the interpolating direction, said apparatus comprising:

a reference pixel data generating means for generating a first row of reference pixel data corresponding to the scan line of pixels which belong to the one of the two fields and lie adjacent to and above the pixel to be interpolated and a second row of reference pixel data corresponding to the scan line of pixels which belong to the one of the two fields and lie adjacent to and below the pixel to be interpolated;

an interpolating direction determining means for determining an interpolating direction for the pixel to be interpolated based on the calculated result of the correlations between a first block of data which consists a group of pixel data of a predetermined number of consecutive reference pixels and belongs to the first row of reference pixel data and a second block of data which consists of a group of pixel data of the same number of consecutive reference pixels, belongs to the second row of reference pixel data and lies opposite the first block of data with the pixel data to be interpolated in between; and an interpolating pixel data producing means for producing data for the pixel to be interpolated based on the pixel data corresponding to the pixels which lie in the interpolating direction determined by said interpolating direction determining means and belong to the scan lines of the one of the two fields and are located adjacent to, and above and below the pixel to be interpolated.

2. An image data interpolating apparatus for producing one frame of data using one of two fields of data which respectively constitute pixel data on the odd-numbered scan lines and even-numbered scan lines of a frame data so that the pixel data on the even-numbered or odd-numbered scan lines of the other field will be interpolated, wherein one frame of data is yielded by interpolating one field of data by such steps including: determining an interpolating direction on the basis of a pixel to be interpolated; and producing interpolating pixel data corresponding to the pixel to be interpolated based on the pixel data of the pixels located in the interpolating direction, said apparatus comprising:

a judging means for judging whether interpolating data of the pixel to be interpolated is proper based on the comparison of the interpolating pixel data with the pixel data of the pixels adjacent to or near the pixel to be interpolated; and an interpolating data correcting means for correcting the interpolating pixel data by replacing the interpolating pixel data with a piece of correcting data which is prepared from the pixel data of the pixels neighboring or near the pixel to be interpolated when the result of the judgment by said judging means indicates the necessity of correction.

3. An image data interpolating apparatus according to claim 1, wherein said interpolating direction determining means calculates the correlations by weighting in accordance with the interpolating direction.

4. An image data interpolating apparatus according to claim 2, wherein said judging means makes the comparison of the interpolating pixel data with the pixel data of the pixels neighboring or near the pixel to be interpolated, by evaluating the second-order derivatives or the eight-directional laplacian.

5. An image data interpolating apparatus having a movement detecting means for detecting the movement in a frame of image which consists of two fields of image, namely odd and even fields in interlaced scanning, wherein said movement detecting means comprises: a data composing means for newly composing the first movement detecting field data in one of the two fields of data by performing pixel interpolation so that the distance between the scan lines in the vertical direction is divided in a ratio of a:1−a where 0<a<1 and a≠0.5 and newly composing the second movement detecting field data in the other field of data by performing pixel interpolation so that the distance between the scan lines in the vertical direction is divided in a ratio of 0.5+a:0.5−a; and a data difference detecting means for detecting the difference between the first movement detecting field data and the second movement detecting field data.

6. An image data interpolating apparatus according to claim 5, wherein said data difference detecting means comprises: a calculating means for calculating the difference between the pixel data of the first movement detecting field data and that of the pixel data of the second movement detecting field data, both at the corresponding positions within each field; a movement judging threshold-outputting means; and a comparing means for comparing the output value from said calculating means with the movement judging threshold outputted from said movement judging threshold-outputting means, and said movement judging threshold-output means has a movement judging threshold-generating means which generates the movement judging threshold as a sum of a fixed component and a variable component controlled depending upon the characteristic of the image.

7. An image data interpolating apparatus according to claim 6, wherein the variable component is determined by the steps of: selecting the minimum value as the first parameter from first and second absolute values which are calculated for a target pixel whose movement is detected and a couple of pixels located adjacent to, and above and below the target pixel, all residing within the same field, where the first absolute value is defined as the absolute value of the difference in the pixel data between the target pixel and the upper pixel and the second absolute value is defined as the absolute value of the difference in the pixel data between the target pixel and the lower pixel; calculating the second parameter which is the absolute value of the difference in the pixel data between the pixels adjacent to, and above and below the target pixel within the other field; and determining the variable component based on the maximum of the first and second parameters.

8. The image data interpolating apparatus according to claim 1, wherein the interpolation is first in the horizontal direction.

\* \* \* \* \*